(12) United States Patent
Bizzarri et al.

(10) Patent No.: US 10,425,845 B2
(45) Date of Patent: Sep. 24, 2019

(54) RADIO ACCESS NETWORK NODE FOR A TELECOMMUNICATION NETWORK

(71) Applicant: TELECOM ITALIA S.p.A., Milan (IT)

(72) Inventors: Simone Bizzarri, Turin (IT); Andrea Buldorini, Turin (IT); Andrea Schiavoni, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/090,751

(22) PCT Filed: Apr. 12, 2016

(86) PCT No.: PCT/EP2016/057992
§ 371 (c)(1),
(2) Date: Oct. 2, 2018

(87) PCT Pub. No.: WO2017/178038
PCT Pub. Date: Oct. 19, 2017

(65) Prior Publication Data
US 2019/0116507 A1    Apr. 18, 2019

(51) Int. Cl.
*H04W 40/00*        (2009.01)
*H04W 24/02*        (2009.01)
(Continued)

(52) U.S. Cl.
CPC .......... *H04W 24/02* (2013.01); *H04B 7/0617* (2013.01); *H04W 16/18* (2013.01);
(Continued)

(58) Field of Classification Search
CPC ..... H04W 24/02; H04W 16/18; H04W 36/08; H04W 24/08; H04W 24/10; H04W 4/00;
(Continued)

(56) References Cited

U.S. PATENT DOCUMENTS 6,356,758 B1 *   3/2002   Almeida ............... H04W 16/18
                                                   455/422.1
6,522,875 B1 *   2/2003   Dowling ............. H04L 12/1859
                                                   455/414.3
(Continued)

FOREIGN PATENT DOCUMENTS

EP   0 928 121 A2      7/1999
EP   0928121 A2 *      7/1999   ............ H04W 16/18
(Continued)

OTHER PUBLICATIONS

International Search Report dated Dec. 19, 2016, in PCT/EP2016/057992, filed Apr. 12, 2016.

*Primary Examiner* — Mahendra Patel
(74) *Attorney, Agent, or Firm* — Oblon, McClelland, Maier & Neustadt, L.L.P.

(57) ABSTRACT

A radio access network node of a telecommunication network and method, the node including: a system of radiating antennas radiating radio signals through a geographic territory, and a processor configured to execute computer-readable instructions to: obtain or generate a topographic map of the geographic territory; based on the topographic map, calculate a coverage map of radio coverage of the geographic territory by the radiated radio signals; based on the coverage map, shrink the topographic map to obtain a reduced-size topographic map; based on the calculated coverage map, create a first data structure including plural first data structure records, one for each point of the calculated coverage map, each first data structure records providing a description of a service delivery capability of the node in that point, and exploit the first data structure to decide how to serve user equipment located in the territory corresponding to the reduced-size topographic map.

22 Claims, 13 Drawing Sheets

(51) Int. Cl.
*H04B 7/06* (2006.01)
*H04W 16/18* (2009.01)
*H04W 36/08* (2009.01)
*H04B 7/02* (2018.01)
*H04W 24/10* (2009.01)

(52) U.S. Cl.
CPC ............... *H04W 36/08* (2013.01); *H04B 7/02* (2013.01); *H04W 24/10* (2013.01)

(58) Field of Classification Search
CPC ........ H04W 4/60; H04L 67/306; H04L 41/12; H04L 43/0882; H04L 67/104; H04L 67/06; H04L 67/1091; H04Q 7/36; G06Q 30/0283; H04B 7/02; H04B 7/06
USPC .......... 455/446, 512, 440; 370/338; 709/224
See application file for complete search history.

(56) References Cited

U.S. PATENT DOCUMENTS

| | | | | |
|---|---|---|---|---|
| 2003/0220774 A1* | 11/2003 | Fattouch | ............... | H04W 16/18 703/2 |
| 2004/0233387 A1* | 11/2004 | Huang | ................... | A61B 3/107 351/212 |
| 2004/0242158 A1* | 12/2004 | Fattouch | ............... | H04W 16/18 455/63.1 |
| 2007/0097882 A1* | 5/2007 | Taylor | ..................... | H04L 41/12 370/254 |
| 2012/0122476 A1* | 5/2012 | Lee | ......................... | H04W 4/02 455/456.1 |
| 2013/0142059 A1* | 6/2013 | Di Girolamo | .......... | H04L 12/66 370/252 |
| 2015/0326994 A1* | 11/2015 | Egner | ..................... | H04W 4/00 455/513 |
| 2017/0150365 A1* | 5/2017 | Goswami | ............... | H04W 16/18 |

FOREIGN PATENT DOCUMENTS

| | | | | |
|---|---|---|---|---|
| FR | 2 997 813 A1 | 5/2014 | | |
| FR | 2997813 A1 * | 5/2014 | ............ | H04W 24/02 |
| WO | WO 97/36255 A1 | 10/1997 | | |
| WO | WO-9736255 A1 * | 10/1997 | ............ | H04W 16/18 |
| WO | WO-2004112414 A1 * | 12/2004 | ........ | G06Q 30/0283 |
| WO | WO-2013127355 A1 * | 9/2013 | ............ | H04W 24/02 |
| WO | WO-2014144760 A1 * | 9/2014 | ........... | G01S 5/0236 |
| WO | WO-2015106237 A1 * | 7/2015 | ............ | H04W 16/14 |

* cited by examiner

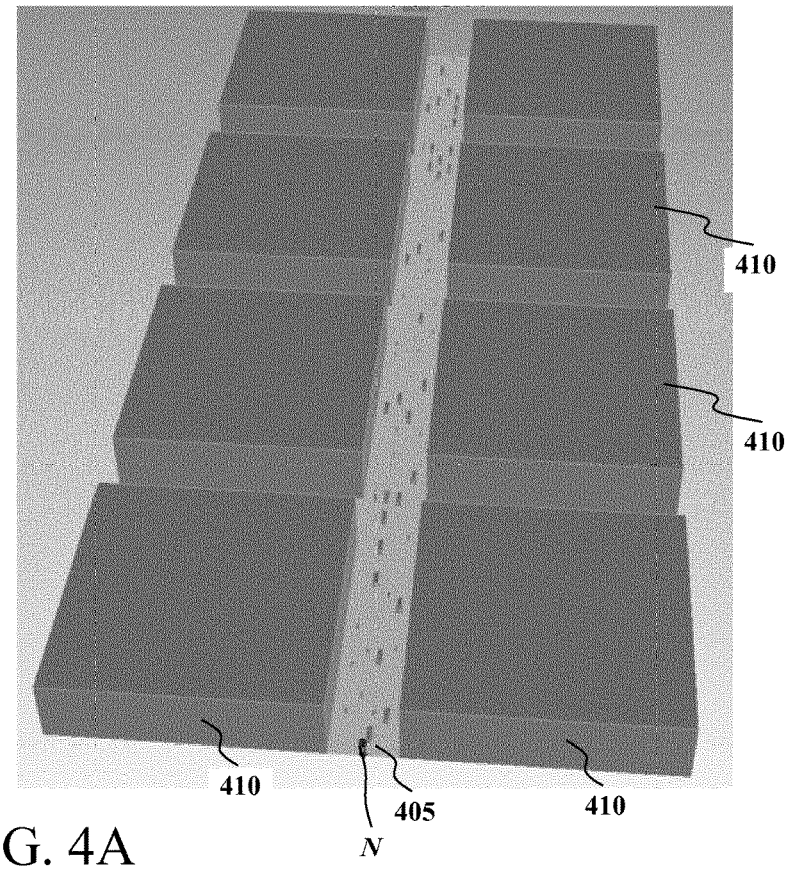
FIG. 4A
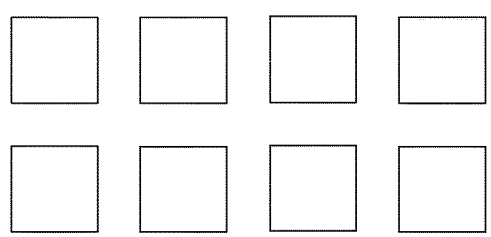
FIG. 4B
FIG. 4C
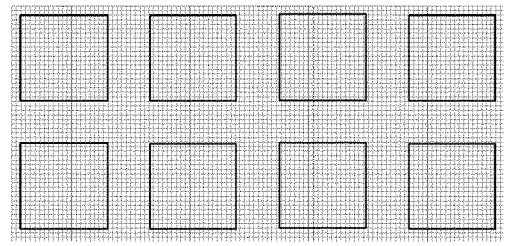

RADIO ACCESS NETWORK NODE FOR A TELECOMMUNICATION NETWORK

BACKGROUND

Technical Field

The solution disclosed in this document generally relates to the field of telecommunications. Particularly, the solution here disclosed relates to radio telecommunication networks, and even more particularly to mobile radio telecommunication networks.

Overview of the Related Art

Radio telecommunication networks, particularly mobile radio telecommunication networks, comprise a Radio Access Network (RAN), based on one or more Radio Access Technologies (RATs, e.g. 2G, 3G, 4G, 5G as defined by the 3GPP—Third Generation Partnership Project), and a core network. Network nodes of a mobile RAN, as an example radio base stations or micro/pico nodes of micro/pico network cells (e.g., eNodeBs of Long Term Evolution—LTE— and LTE—Advanced—LTE-A-networks), from now on named indistinctly as nodes, in their operative context do not make use of information based on and/or representative of the topographical environment, descriptive of the urban environment and/or the orography of the geographic territory subtended by the nodes in terms of geometrical description of buildings, infrastructures and any type of scenario into which they operate. On the other hand, such information is important for the aim of the electromagnetic field propagation etc.

In some implementations, as for example described in FR 2997813 A1, the nodes may collect information and measurements related to the radio signal strength or quality together with geolocation information of a single measurement sample or a group of measurements samples. The collected information and measurements can be used to derive a partial knowledge of the topographical environment (e.g., to identify areas where the radio coverage is poor or to infer the existence of main streets/buildings) by observing degradation of system performances due to propagation and traffic, but the use of the collected information and measurements is not intended to allow the node detect the root causes related to the territory topography.

Position planning and radio signal propagation analysis over the topographical environment in which the nodes operate are processes performed outside of the nodes; the generic node is not made aware of these sets of information, it is not informed about what is the environment where it is operating and, as a consequence, the node cannot make use of these pieces of information to take decisions in its operational activity.

Also, relationships with neighboring nodes do not take into account the knowledge of the environmental conditions where each of the neighboring nodes operates.

In general, nowadays the normal way of working of mobile radio telecommunication networks, as far as network nodes are concerned, can be summarized into the following sets of operations:
  management of the nodes and/or network and system configuration, intended as the activities performed at the Operation & Maintenance (O&M) level for the purposes of the maintenance of the nodes; an example can be the updating of the list of adjacencies of a node;
  occasional operations, such as for example the deployment on the field of new RATs, that change sporadically during the life cycle of the nodes;
  real time operations used both to manage User Equipment (UE), for example inter-cell handover used to manage (in real time and on the basis of the operative context) a moving UE in a specified time frame and to adapt the nodes configuration based on e.g. load conditions or traffic information.

However, a node can perform interference status management over its own territory only once the node has the knowledge of the interference situation reported by measurements performed by UE during connection or when a UE requires a service to the node.

In J. van de Beek, T. Cai, S. Grimoud, P. Mähönen, J. Nasreddine, J. Riihijärvi, B. Sayrac, "How a layered REM architecture brings cognition to today's mobile networks", IEEE Wireless Communications Magazine, August 2012 the concept of REM—Radio Environment Map—is discussed and analyzed. REM has been deeply analyzed within the frame of the FARAMIR project (http://www.ict-faramir.eu/). In the introduction of the paper, the authors state "A REM can be thought of as a knowledge base used to dynamically store information related to the radio environment of wireless systems. This information can either be represented by raw radio field measurements or, more efficiently, as the result of modeling processes such as statistical behavioral descriptions. REMs are currently being studied and specified in ETSI's emerging standard on Reconfigurable Radio Systems. In contrast to the static databases used in 3G and LTE systems, REMs provide a wireless network with a comprehensive and up-to-date representation of the radio environment including dynamic knowledge on propagation environment, which can be used to optimize radio resources".

The degrees of freedom, intended as a set of technologies and parameters that a node is able to configure in different ways in order to satisfy UE service requests, can be listed in:
  available RATs, as an example LTE/LTE-A, HSPA (High-Speed Packet Access), etc.;
  available frequency bands and allowed channels, per RAT;
  list of adjacent nodes where to direct or redirect the UE by means of handover operations;
  list of antenna systems and beams per RAT equipping the node, where in this context a beam can be fixed or steerable.

In any case, whatever the selected node configuration is, it does not take into account any information coming from the environmental radio propagation conditions experimented by the radio signals emitted by the node and/or similar radio signals propagation aspects regarding neighboring network nodes.

Under these conditions, at present, the decisions that a node can make about the best choice of configuration to adopt for what is relevant to a service request coming from a served UE, or for a service request coming from a to-be-served UE, for a certain UE mode (for example: idle mode, connected mode) are not based on any a-priori internal knowledge regarding the status of the environmental radio propagation condition, the UE and the geographical distribution of the load over the node operation area, and do not take into account neighboring nodes' operation area over the environmental operative context.

To date, the knowledge a node has of its own operational area does not include information regarding the topography of the environment and an a-priori coverage/interference information about the topography, but at most includes information collected only by UE in connected mode during their activity.

WO 2013/127355 A1 describes a modality to collect measurements by UE in order to build a REM Map and to use it to allocate node's resources.

US 2012/0122476 A1 deals with the creation of geo context info data set, collecting spatial information, sensor data and context in order to provide spatial based services to a UE.

US 2015/0326994 A1 is related to a UE profiling even if data relevant to the characterization of the electromagnetic environment are indicated too.

M. Proebster et al., "Context-aware resource allocation for cellular wireless networks", EURASIP Journal on Wireless Communications and Networking 2012, 2012:216 (http://jwcn.eurasipjournals.com/content/2012/1/216), is relevant to the definition of a Radio Resource Management (RRM) procedure based on the context where the UE is; also in this case information collected by the UE are transferred to the node where are elaborated and used to optimize decisions at RRM level.

FR 2997813 A1, already cited above, deals with the definition of a procedure for the optimization of the node's coverage on the base of the collections of measurements taken by the UE. Measurements are then referenced to the topography of the served area and used to optimize coverage, as an example to fill holes in coverage.

SUMMARY OF THE SOLUTION DISCLOSED IN THIS DOCUMENT

The Applicant has tackled the problem of the known approaches in the seek to improve operation flexibility of the nodes of telecommunication networks.

According to the solution disclosed in this document, there is provided a radio access network node of a telecommunication network, comprising:
 a system of radiating antennas comprising at least one radiating antenna for radiating radio signals through a geographic territory;
 a processor configured to execute computer-readable instructions so as to:
  obtain or generate a topographic map describing the topography of said geographic territory;
  based on said topographic map, calculate a coverage map of the radio coverage of the geographic territory by the radio signals radiated by the system of radiating antennas;
  based on said coverage map, shrink the topographic map to obtain a reduced-size topographic map describing the topography of a geographic area, within said geographic territory, that can be served by the node;
  based on the calculated coverage map, create a first data structure comprising a plurality of first data structure records, one for each point of the calculated coverage map, each of said first data structure records providing a description of a service delivery capability of the node in that point;
  exploit the first data structure to decide how to serve user equipment located in the territory corresponding to said reduced-size topographic map.

Preferably, in an embodiment said processor is further configured to execute computer-readable instructions so as to:
 identify neighbor network nodes in the neighborhood of the node;
 based on the reduced-size topographic map, create a second data structure comprising a plurality of second data structure records, one for each point of the minimal topographic map, each of said second data structure records providing a description of a service delivery capability, in that point, of at least one neighbor network node, and
 decide whether to have the node serve or continue to serve a user equipment located in a point of the geographic area served by the node or to cause the node ask a neighbor node to serve the user equipment, based on the data contained in the first data structure and second data structure.

Said topographic map of said geographic territory may comprise one among a two-dimensional (2D) map of the geographic area enriched with estimations of heights and a three-dimensional (3D) topography map of said geographic territory.

Said topographic map of said geographic territory can either be downloaded from a remote database of digital topographic maps of the environment, or it can be generated onsite by the node or by a remote system in real time by processing mono/stereoscopic images of the environment.

In an embodiment, said description of a service delivery capability of the node in a point may comprise one or more of:
 an indication of a Radio Access Technology—RAT—used to serve that point;
 an indication of a radiating antenna of the system of radiating antennas used to cover that point;
 an indication of a frequency channel associated to that point;
 an indication of a radio coverage quantity associated to that point.

Advantageously, said processor can be configured to execute computer-readable instructions so as to update the first data structure in response to a change in a configuration of the network node.

In an embodiment, each of said second data structure records contains data corresponding to the data contained in the first data structure record of the at least one neighbor network node for the considered point. Each of said second data structure records may also contain an identifier of the at least one neighbor node.

Advantageously, said processor can be configured to execute computer-readable instructions so as to update the second data structure in response to a change in a configuration of at least one neighbor network node.

According to an embodiment, said processor can be further configured to execute computer-readable instructions so as to:
 create a third data structure comprising a plurality of third data structure records, each of said third data structure records containing, for user equipment served by the node, data indicative of territory points, in the territory corresponding to said reduced-size topographic map, visited by said served user equipment, and data indicative of types of services provided by the node to the served user equipment in each territory point.

Advantageously, said processor van be further configured to execute computer-readable instructions so as to:
 exploit the information contained in the third data structure for deriving at least one of:
  a geo-referenced map of the services provided by the node to user equipment for the time the user equipment are served by the node;
  trajectories of the user equipment served by the node N, and decide in advance actions to be undertaken by the node, such actions including at least one of:
  selection of the best serving radiating antenna for optimization of coverage while each user equipment is moving;
  optimization overall service capability of the node, including selection of the radiating antenna adapted to reduce interference and energy consumption;
  management of interference by selecting radiating antennas to serve different user equipment or changing serving radio frequency or RAT, based on data contained in the first data structure and second data structure;
  change of serving node.

In an embodiment, said processor can be further configured to execute computer-readable instructions so as to:
  create a fourth data structure comprising a list of fourth data structure records, one for each point of the reduced-size topographic map, each of said fourth data structure records containing data indicative of the type of services required in the time by user equipment that remain stationary in that point for a predetermined time duration, and
  exploit the information contained in the fourth data structure for having the node to foresee services to be provided to served user equipment approaching a point of the reduced-size topographic map.

Still according to the solution disclosed in this document, there is provided a of operating a radio access network node of a telecommunication network, the node comprising a system of radiating antennas comprising at least one radiating antenna for radiating radio signals through a geographic territory, the method comprising:
  obtaining or generating a topographic map describing the topography of said geographic territory;
  based on said topographic map, calculating a coverage map of the radio coverage of the geographic territory by the radio signals radiated by the system of radiating antennas;
  based on said coverage map, shrinking the topographic map to obtain a reduced-size topographic map describing the topography of a geographic area, within said geographic territory, that can be served by the node;
  based on the calculated coverage map, creating a first data structure comprising a plurality of first data structure records, one for each point of the calculated coverage map, each of said first data structure records providing a description of a service delivery capability of the node in that point;
  exploiting the first data structure to decide how to serve user equipment located in the territory corresponding to said reduced-size topographic map.

Advantageously, in an embodiment the method may further comprise:
  identifying neighbor network nodes in the neighborhood of the node;
  based on the reduced-size topographic map, creating a second data structure comprising a plurality of second data structure records, one for each point of the minimal topographic map, each of said second data structure records providing a description of a service delivery capability, in that point, of at least one neighbor network node, and
  deciding whether to have the node serve or continue to serve a user equipment located in a point of the geographic area served by the node or to cause the node to ask a neighbor node to serve the user equipment, based on the data contained in the first data structure and second data structure.

The method may comprise either downloading said topographic map of said geographic territory from a remote database of digital topographic maps of the environment, or generating said topographic map onsite at the node or at a remote system in real time by processing mono/stereoscopic images of the environment.

Preferably, the method comprises updating the first data structure in response to a change in a configuration of the network node.

In an embodiment, each of said second data structure records contains data corresponding to the data contained in the first data structure record of the at least one neighbor network node for the considered point, and an identifier of the at least one neighbor node.

Advantageously, the method can comprise updating the second data structure in response to a change in a configuration of at least one neighbor network node.

In an embodiment, the method further comprises:
  creating a third data structure comprising a plurality of third data structure records, each of said third data structure records containing, for user equipment served by the node, data indicative of territory points, in the territory corresponding to said reduced-size topographic map (305'), visited by said served user equipment, and data indicative of types of services provided by the node to the served user equipment in each territory point.

Advantageously, the method further comprises:
  exploiting the information contained in the third data structure for deriving at least one of:
    a geo-referenced map of the services provided by the node to user equipment for the time the user equipment are served by the node;
    trajectories of the user equipment served by the node N, and
  deciding in advance actions to be undertaken by the node, such actions including at least one of:
    selection of the best serving radiating antenna for optimization of coverage while each user equipment is moving;
    optimization overall service capability of the node, including selection of the radiating antenna adapted to reduce interference and energy consumption;
    management of interference by selecting radiating antennas to serve different user equipment or changing serving radio frequency or RAT, based on data contained in the first data structure and second data structure;
    change of serving node.

In an embodiment, the method further comprises:
  creating a fourth data structure comprising a list of fourth data structure records, one for each point of the reduced-size topographic map, each of said fourth data structure records containing data indicative of the type of services required in the time by user equipment that remain stationary in that point for a predetermined time duration, and
  exploiting the information contained in the fourth data structure (365) for having the node to foresee services to be provided to served user equipment approaching a point of the reduced-size topographic map.

BRIEF DESCRIPTION OF THE DRAWINGS

These and other features and advantages of the solution disclosed in this documents will appear more clearly by reading the following detailed description of exemplary embodiments thereof, provided merely by way of non-limitative example. For better intelligibility, the solution should be read making reference to the attached drawings, wherein:

FIG. 4A shows an exemplary three-dimensional topographical map;

FIG. 4B shows a plan view of the topographical map of FIG. 4A;

FIG. 4C shows a discretized version of the plan view of FIG. 4B;

DETAILED DESCRIPTION OF EXEMPLARY EMBODIMENTS OF THE SOLUTION DISCLOSED IN THIS DOCUMENT

Figure 1:
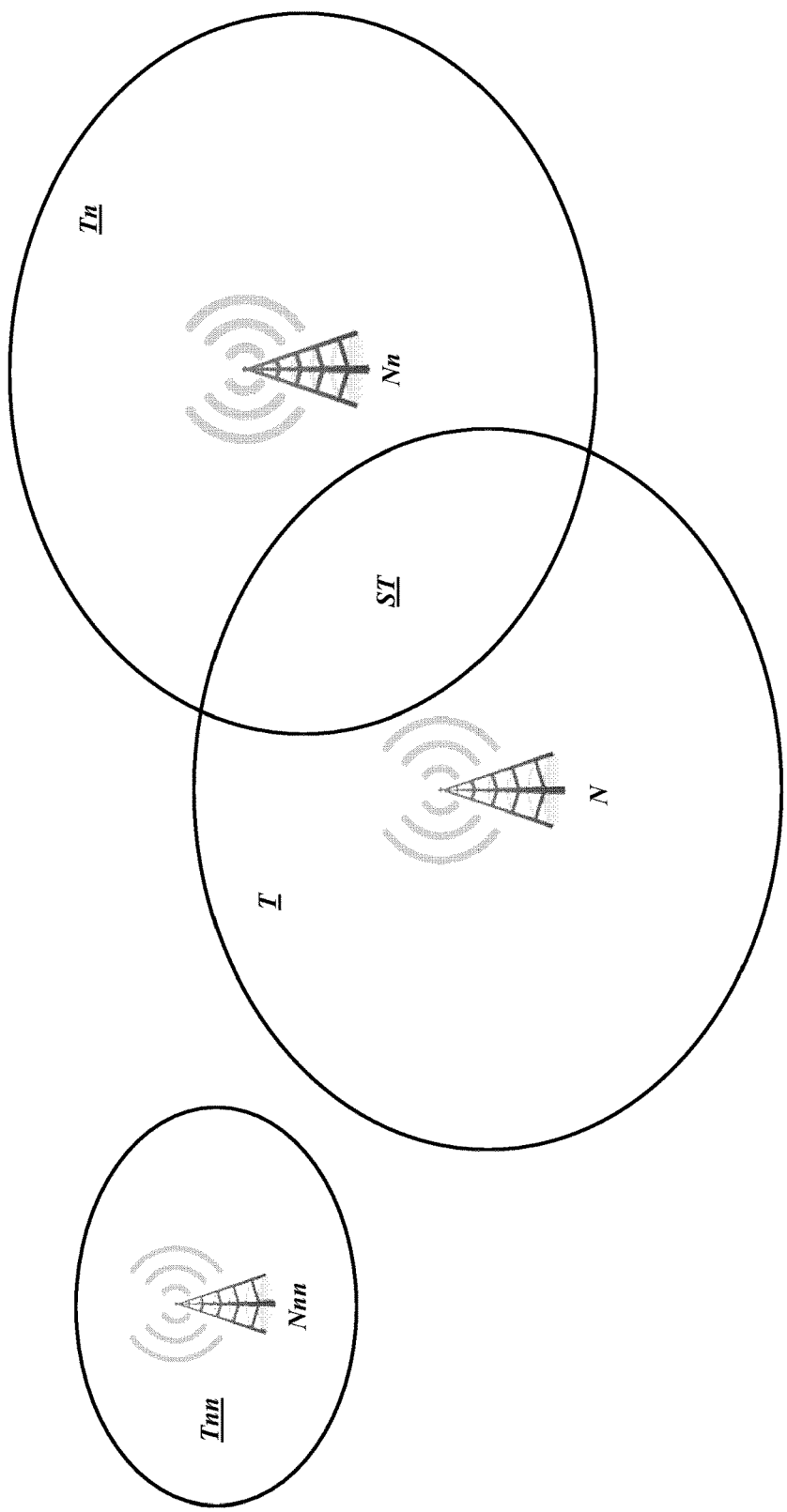
FIG. 1 shows pictorially a portion of a radio telecommunication network.

FIG. 1 shows pictorially a (small) portion of a radio telecommunication network comprised of three network nodes N, Nn and Nnn. Reference numerals T, Tn and Tnn denote the geographic territory (geographic area) covered (i.e., served) by nodes N, Nn and Nnn respectively. Node N in the following description will be regarded as the network node under consideration, node Nn is a network node in the neighborhood of node N (neighbor network node) and node Nnn is a network node which is not in the neighborhood of node N (non-neighbor network node). A network node, like the node Nn, is a neighbor node to another node, like node N, if there is a relationship between the two nodes N and Nn, as an example the two nodes serve a shared portion of territory (like the territory ST in the drawing). A network node, like the node Nnn, is not a neighbor node to another node, like node N, if there is not a relationship between the two nodes.

Let a network node of a radio telecommunication network be considered which has to be placed in a defined geographical territory position, or a network node that is already deployed on the field (in a certain geographical territory position) and that has to be upgraded/updated with additional features, for example, but not limited to, a new RAT (for example, a network node that was previously equipped with a GSM—"2G"—and UMTS—"3G"—RATs, is to be upgraded by equipping it with a LTE/LTE-A—"4G"—RAT). Making reference to FIG. 1, such a node is taken to be node N.

Figure 2:
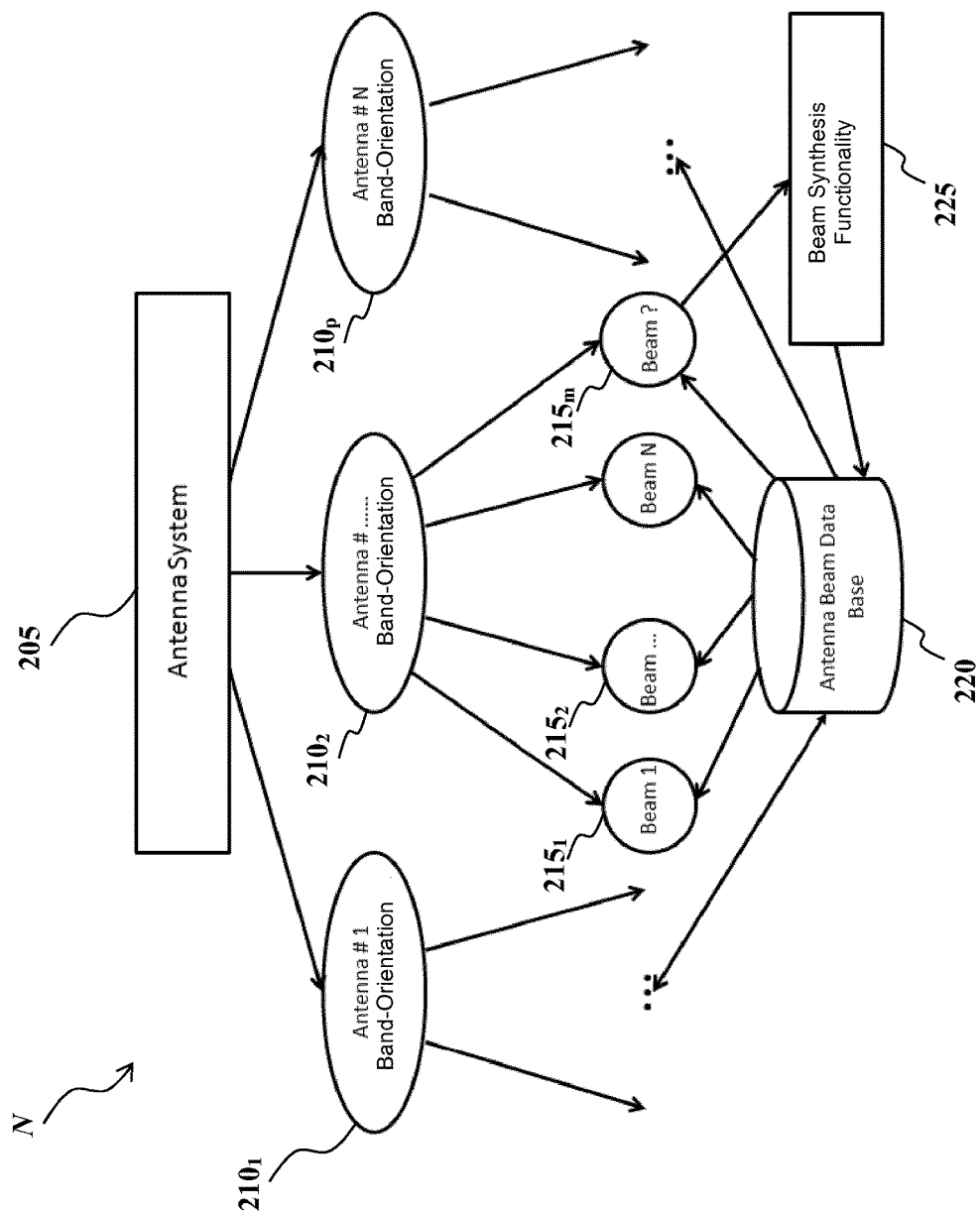
FIG. 2 shows schematically a system of antennas of a network node of FIG. 1.

Referring to FIG. 2, let it be assumed that such a node N is equipped with a radiating system (antenna system) 205 including a certain number of antennas $210_1$-$210_p$ (from 1—just one antenna—to a generic number p of antennas), each antenna having the possibility to manage 1 to m radiating beams (antenna beams) $215_1$-$215_m$.

The antenna system 205 comprises an antenna beam data base 220 which is a repository where, for each beam $215_1$-$215_m$ of the antenna system 205, there is stored a set of data, parameters and settings in order to allow the generic antenna $210_1$-$210_p$ to generate and radiate the selected beam; as an example, if the antenna radiator is an antenna array, the data base 220 contains, for each beam that the antenna array can generate, the list of weights to be associated to each current feeding each array radiating element to generate the beam.

The antenna system 205 also comprises a functionality for beam synthesis 225, which is a system, implemented locally on the node N or remotely, that is able to synthesize data, parameters and settings in order to allow the antenna $210_1$-$210_p$ to generate a beam with given characteristics, in case the needed beam is not present in the beam data base 220. Once the set of data, parameters and settings to synthesize an antenna beam has been determined by the functionality for beam synthesis 225, the set of data is stored in the beam data base 220 and made available for subsequent use by the node N.

Figure 3:
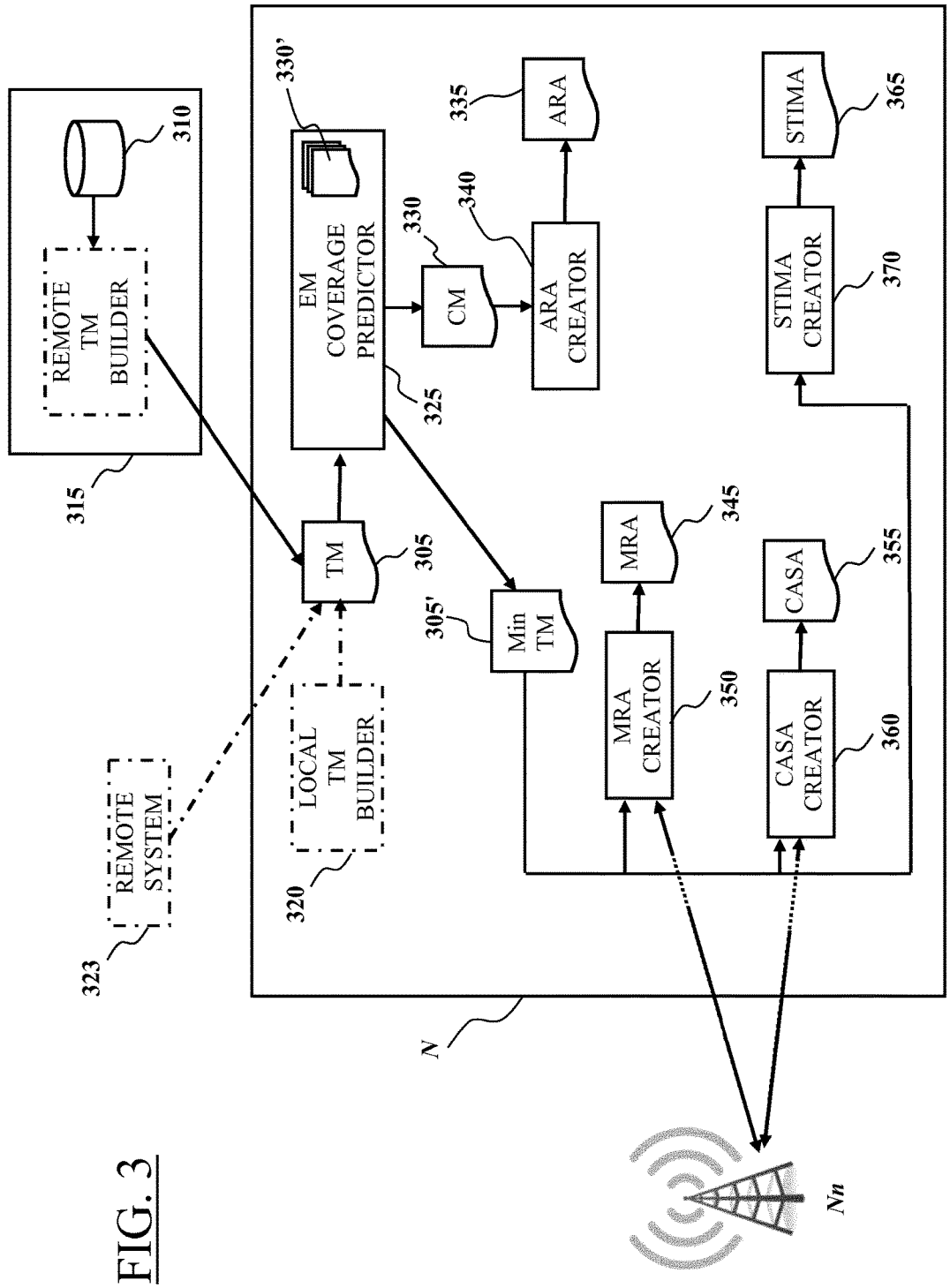
FIG. 3 shows functional blocks configured to implement an embodiment of the solution disclosed in this document.

Reference is now made to FIG. 3, showing functional blocks of the node N configured to implement an embodiment of the solution disclosed in this document. The node N includes a data processor configured to execute computer-readable instructions so as to implement the functions of the functional blocks depicted in FIG. 3.

As schematized in FIG. 3, the node N has available a detailed description of the geographic territory, of the geographic environment associated to the territory where the node N is placed and (is intended to) operate(s). Such a detailed description of the geographic territory is from now on referred to as "Topographical Map" (TM) 305. The TM 305 can be a two-dimensional (2D) map of the node's geographic environment enriched, if necessary, with heights or estimations of the heights (as an example, hills/mountains heights or buildings heights). Alternatively, the TM 305 can be a three-dimensional (3D) topography map of the environment associated to the territory where the node operates. FIG. 4A shows an exemplary 3D topography map for an environment constituted by a "town canyon", i.e. a zone of a town with a central boulevard 405, four building blocks 410 on each side of the central boulevard 405 and three side boulevards departing from each side of the central boulevard 405 between the building blocks 410. FIG. 4B shows a plan (2D) view of the exemplary 3D topography map of FIG. 4A.

The span, i.e. the extension of the TM 305 depends on the capability related to the radio coverage of the territory by the considered node N. As mentioned above, the TM 305 contains a description of the buildings present on the territory (e.g., the building blocks 410), a description of the orography of the territory and, in general, whatever detail is present in the environment, which is useful for the description of the environment itself (such as for example the type of ground, sand, sea water, street furniture etc.) and which should be taken into account for radio coverage assessment purposes. The 3D spatial resolution of the TM 305 depends on the desired accuracy and is not limitative for the solution here disclosed. The TM 305 can be derived, for example but not limited to, by topography databases of the environment topography (like the database 310 shown in FIG. 3), electronic models of town maps, aerial photogrammetry etc. If necessary, in particular for coverage computation purposes, the TM 305 could also be submitted to a discretization process according to which the whole space is subdivided into basic elements, e.g. parallelepipeds for a 3D TM representation. In this case, for example, a building will be approximated by a sequence of small parallelepipeds. FIG. 4C shows a 2D section of the discretized 3D topography map of FIG. 4A.

The TM 305 can be downloaded from a centralized server 315 that collects, in a database (like the database 310), digital maps of the environment. Once the position of the node N is known, for example by means of geo-referencing (or by storing the node position in the node), the node N can query the centralized server 315 and provide thereto the node N position and radiating capabilities (as better described later on) as entries. The TM 305, in a proper format (for example, but not limited to, .bil, vector arcinfo, .gbr, .dwg formats), is downloaded on the node N. This downloading phase could be managed in different ways:

pop way: the node N sends a request to the centralized server 315 specifying the node identity data and the node geographical position (e.g., the position of the node N in FIG. 4A);

push way: a centralized SON/NM (Self-Organizing Network/Network Management) function is responsible for sending the topographical maps to the network nodes each time there is a need to do this (for example, when a new network node is deployed on the field or when there is some change due to changes in the nodes' configurations in the geographical area).

Alternatively, the TM 305 can be built onsite in the node N by a local TM builder 320 or by a remote system 323 in real time on the basis of the node's N position, radiating capability (as better described later on) and on the basis of a set of mono/stereoscopic images of the environment associated to the territory served by the node N. The mono/stereoscopic images are processed by a specialized system, executing an image processing software, for example by exploiting image recognition tools. Once the set of images relevant to the served territory is uploaded on the system that will process the images, the TM 305 is then generated automatically (and possibly delivered to the node N).

The extension of the TM 305, initially, can be estimated by using the radiation properties of the node N, i.e. antenna gain and maximum radiated power. By knowing the free-space attenuation of the electric field and setting a threshold for the electric field level in the space, below which threshold the electric field level is considered so low that reception by UE of the radio signal is considered not allowed, a rough, initial estimation of the initial extension of the TM 305 can be obtained. Such initial TM 305 is actually a non-optimized, "oversized" TM 305. Preferably, the TM 305 optimal extension will subsequently be accurately computed by using the approach described in the following.

The node N makes use of an Electromagnetic Coverage Predictor (ECP) 325 (the ECP 325 can be a function available internally to the node, as depicted in the drawing, or it can be a function available remotely, for example on a remote server, not shown in the drawing) which, on the basis of the knowledge of the node's N environment provided by the TM 305, is able to compute, for each beam $215_1$-$215_m$ of each antenna $210_1$-$210_p$ of the Antenna System (AS) 205, the coverage level, expressed for example, but not limited to, in terms of electric field in each point of TM. To do this, the ECP 325 can for example use (but this is not limitative) ray tracing techniques associated to electromagnetic field propagation properties (e.g., but not limited to, reflection and diffraction).

For the computations that the ECP 325 has to carry out, it can exploit the maximum radiated power on each beam and the initial, oversized, TM 305.

Figure 5A:
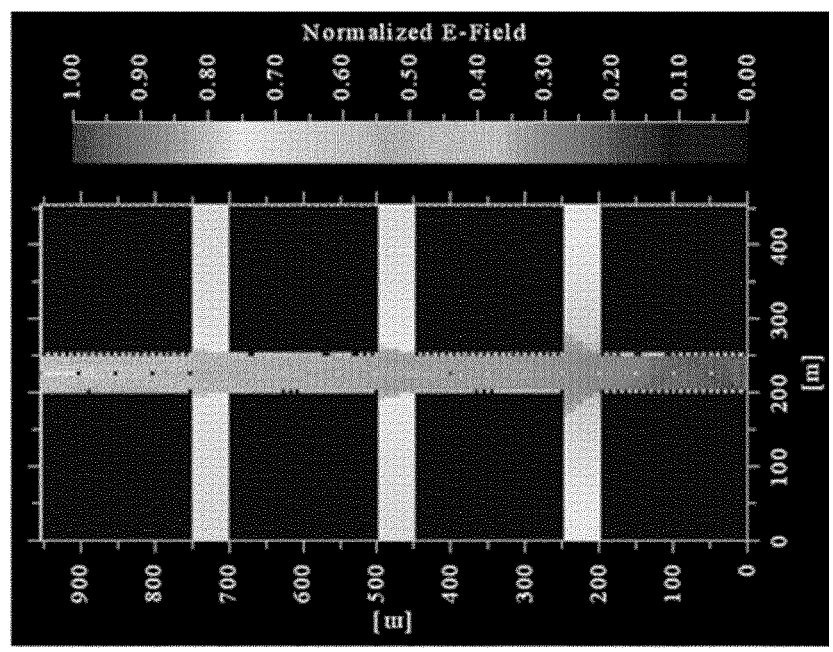
FIG. 5A shows a coverage map for a network node deployed in an exemplary point of the topographical map of FIG. 4A.

An intermediate result of the calculations performed by the ECP 325 is a set 330' of Coverage Maps (CMs), one CM for each beam $215_1$-$215_m$ of each antenna $210_1$-$210_p$ belonging to the AS 205 of the node N, computed over the initial, oversized TM 305. In the generic CM of the set 330', to each point of the initial TM 305 there is associated a level for the radio coverage ("coverage quantity"), expressed for example (but not limited to) as the level of the electric field at that point, for a respective beam $215_1$-$215_m$ of a respective antenna $210_1$-$210_p$ belonging to the AS 205 of the node N. FIG. 5A shows an exemplary CM of the set 330' for the exemplary environment considered in FIG. 4A (the exemplary CM corresponds to one of the beams $215_1$-$215_m$ of one of the antennas $210_1$-$210_p$ belonging to the AS 205 of the node N assumed to be placed at the right central position of the central boulevard 405—see FIG. 4A). In FIG. 5A, the distance along the central boulevard 405 from the node N is reported in abscissa, in meters; the level of the electric field in different positions is indicated by different tones of grey (a darker grey tone corresponds to a higher electric field level).

Figure 5B:
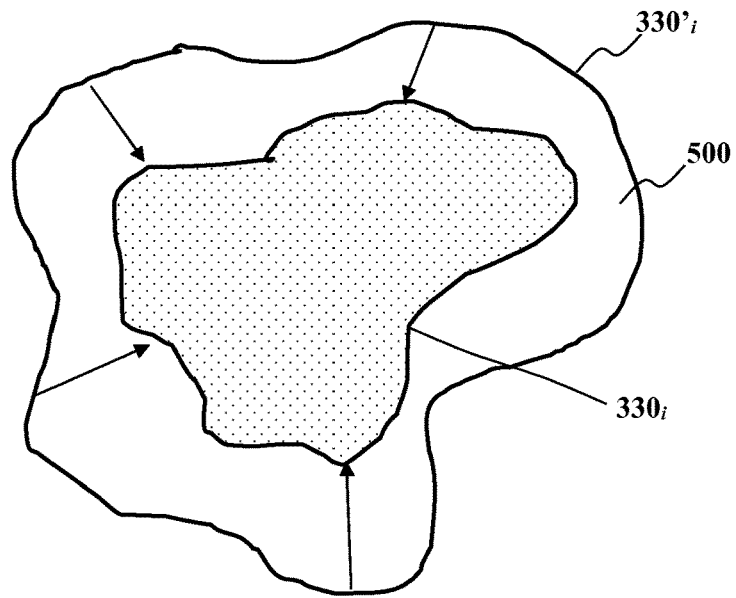
FIG. 5B schematizes a process of shrinkage of a coverage map.

At this stage, the CMs of the set 330' are "oversized" CMs, having the same size, in terms of territorial extension, as the initial, oversized TM 305 and, as the oversized TM 305, the oversized CMs of the set 330' are preferably reduced, shrunk, preferably to the minimum useful dimension for the coverage purposes. In each oversized CM of the set 330', e.g. the oversized CM $330'_i$ depicted in FIG. 5B, all the regions having a computed coverage quantity (e.g., field level) below a lower coverage quantity (e.g., field level) threshold, preferably a minimum coverage quantity (field level) threshold (e.g., region 500 in FIG. 5B) cannot be reached in terms of radio link by the node N and, consequently, such sub-threshold regions are not of interest for coverage purposes. On the other hand, the definition of the lower (minimum) coverage quantity threshold defines a surface, for each CM of the set 330', discriminating regions of the CM that can be reached from regions of the CM that cannot be reached; under this point of view, the separating surface generates a reduced-size CM, preferably a minimum optimal size CM, like the minimum optimal size CM 330, depicted in FIG. 5B, and, consequently, a corresponding shrunk, reduced-size (preferably, minimum) TM 305' (which is a territorial map containing the same territory points as the corresponding minimum optimal size CM $330_i$) for each beam $215_1$-$215_m$ of each antenna $210_1$-$210_m$ belonging to AS 205.

In other words, the reduction of the generic oversized CM to a minimum optimal size CM can be done by setting a threshold ("coverage quantity threshold") for the coverage quantity computed by ECP 325 in constructing the minimum optimal size CMs, so as to get the minimum surface containing all the points of the CM over the coverage quantity threshold. At this stage, a set of minimum optimal size CMs is created, and the generic minimum optimal size CM of the set contains all the points in which the coverage quantity exceeds the coverage quantity threshold and that are potentially reachable for connection to the network. The process of reduction of the oversized CMs is repeated for each CM of the set $330'$ (i.e., for each beam $215_1$-$215_m$ of each antenna $210_1$-$210_p$ belonging to the AS 205 associated to the node N), thereby obtaining, at the end of the process, as many minimum optimal size CMs as many are the beams $215_1$-$215_m$ of each antenna $210_1$-$210_p$ associated to the AS 205. The minimum surface defined by the envelope containing all these minimum optimal size CMs (one for each beam $215_1$-$215_m$ of each antenna $210_1$-$210_p$ belonging to the AS 205 associated to the node N) forms an overall minimal optimal size CM 330 and also defines the dimension for the reduced-size (preferably, minimum) TM $305'$, so the minimal (minimum optimal size) TM $305'$ contains the topographical description of the whole territory that can be reached for connection to the network, by at least one of the beams $215_1$-$215_m$ of at least one of the antennas $210_1$-$210_p$ of the AS 205 associated to the node N.

A first data structure 335, referred to as Auto-Radiation Array (ARA), is then created by a first data structure (ARA) creator 340 starting from the overall minimum optimal size CM 330. The first data structure 335 contains data relevant to the coverage for the TM and radiated by the node itself. The first data structure 335 comprises a plurality of ARA elements, each ARA element corresponding to a respective position (i.e., point representative of a territorial position) of the minimal TM $305'$, and to each ARA element there is associated a node service capacity in that minimal TM $305'$ point, such service capacity being based on the node's N available resources. Specifically, to each point of the territory served by the node N, mapped to an element of the ARA 335—as better described later on—there is associated a list of service records, each service record reporting what the node N can do, in terms of service delivery, in that point. For example, but not limited to, a service record of the list can contain:

the operational mode (the RAT) used by the node to serve that point, for example GSM ("2G"), UMTS ("3G"), LTE/LTE-A ("4G"), fifth generation ("5G"), etc.;
the antenna $210_1$-$210_p$ of the AS 205 of the node and the beam $215_1$-$215_m$ thereof used to cover that point;
the frequency channel associated to that point;
an electric field level, or other relevant coverage quantities, as computed by ECP 325 and stored in the overall minimum optimal size CM 330 associated to each beam $215_1$-$215_m$.

Figure 6:
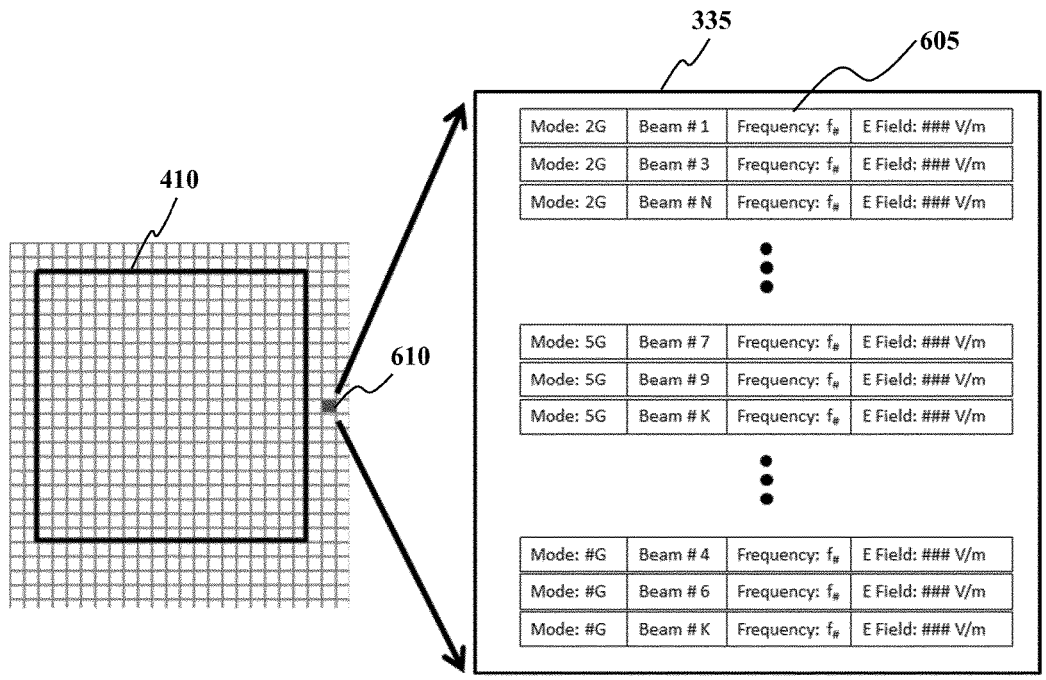
FIG. 6 shows a first data structure built in accordance with an embodiment of the solution disclosed herein.

FIG. 6 shows a part of an exemplary first data structure (ARA) 335. Reference numeral 605 identifies one of the service records of the list of service records in the ARA 335 associated to a generic territory point 610.

The ARA 335 can be considered as the logical combination of all the minimum optimal size CMs 330, associated to all the beams $215_1$-$215_m$ of all the antennas $210_1$-$210_p$ of the AS 205 associated to the node N and has the same size as the minimal TM $305'$. Even if data relating to the coverage capacity of each beam belonging to the antenna system of the node are already contained in the set of minimum optimal size CMs $330_i$, it is more efficient to collect all these data in a unique data structure that is directly related to the minimal TM $305'$. Moreover, the ARA 335 contains more information that the set of minimum optimal size CMs $330_i$, in particular the ARA 335 contains, in addition to the indication of the coverage quantity, information about the antennas and beams used to cover the territory points, information about the frequency channels, information about the RAT. All these pieces of information are collected in single service records, an arrangement that makes the different pieces of information easier to exploit.

The first data structure 335 pertains to and is directly used by the node N in its operation, as described in greater detail later on. Generally stated, the node N can exploit the information contained in the ARA 335 for taking decisions which are influenced by radio signal propagation aspects and intra-cell interference aspects, taking into account the knowledge of the node's environment (as provided by the minimal TM $305'$ and the overall minimum optimal size CM 330).

When a network node changes its configuration, it updates its ARA 335. A configuration change, in this context, means whichever change can affect the radiation characteristics experienced by a territory point in the node's TM, thereby causing a change of a node's ARA 335. For example, an increase in the radiating power on one frequency of an antenna of the antenna system of the node generally produces a change (enlargement) of the minimal TM $305'$; in this case, a new minimal TM $305'$ needs to be generated.

According to an advantageous embodiment of the solution disclosed herein, a second data structure 345, belonging to the node N and referred to as Mutual-Radiation Array (MRA), is created by a second data structure (MRA) creator 350. In the second data structure 345, for each position (point) of the territory served by the node and included in the minimal TM $305'$, there is associated a service capability in that point of the neighbor nodes located in the neighborhood of the node N, like the node Nn in FIG. 1. In the practice, the MRA 345 collects a picture of the ARA 335 pertaining to neighbor nodes (e.g., the node Nn) over the territory shared with the considered node N (the territory shared by nodes N and Nn is denoted ST in FIG. 1). The MRA 345, at its maximum extension, has the same size as the ARA 335 and the minimal TM $305'$ (this happens in case every point of the territory of the minimal TM $305'$ of the node N is shared with at least one neighbor network node). In each point of the MRA 345 a list of records is defined, and each record can contain at least:

the (identifier of a) neighbor node serving the considered point;
the operational mode (the RAT) used by the considered neighbor node to serve the considered point, as an example GSM ("2G"), UMTS ("3G"), LTE/LTE-A ("4G"), fifth generation ("5G"), etc.;
the antenna $210_1$-$210_p$ of the AS 205 of the considered neighbor node and the beam $215_1$-$215_m$ thereof used by the neighbor node to cover the point;
the frequency channel associated to the point by the neighbor node;
an electric field level, or other relevant coverage quantities (as computed by ECP 325 of the neighbor node and) stored in the ARA 335 of the neighbor node.

Figure 7:
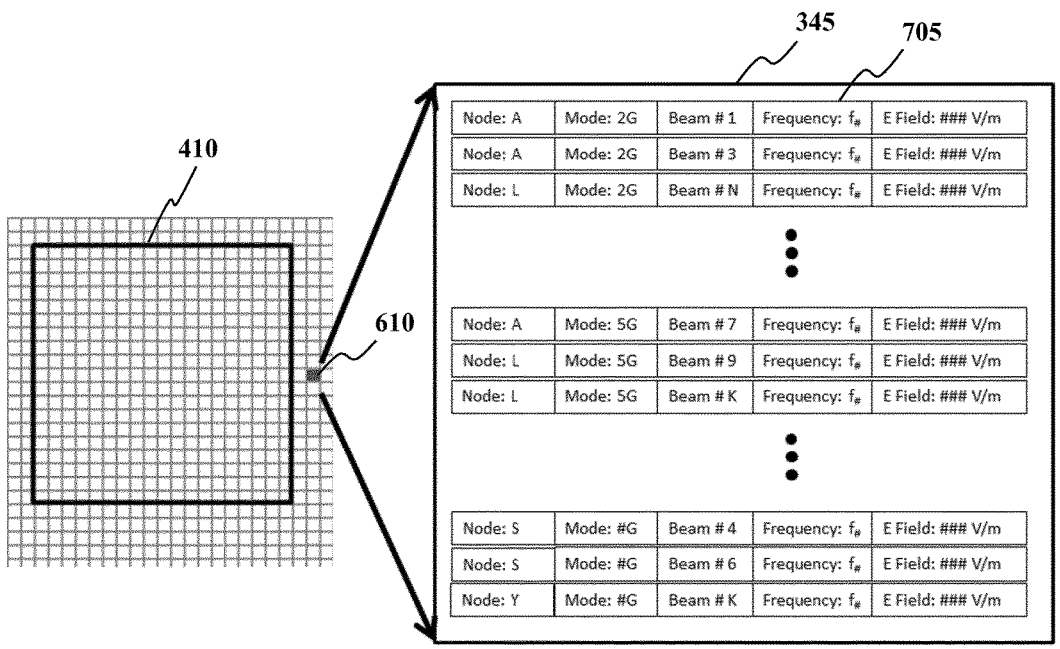
FIG. 7 shows a second data structure built in accordance with an embodiment of the solution disclosed herein.

FIG. 7 shows (a part of) an exemplary second data structure (MRA) 345 (the part of the MRA 345 shown in FIG. 7 is that corresponding to the generic territory point 610 already considered in FIG. 6). Reference numeral 705 identifies one of the records of the list of records in the MRA 345 associated to the generic point 610. Letters "A", "L", "S", "Y" are meant to be identifiers of neighbor nodes.

Like the first data structure 335, the second data structure 345 pertains to and is directly used by the node N in its operation, as described in greater detail later on. Generally stated, the node N can exploit the information contained in the MRA 345 for taking decisions which are influenced by inter-cell signal interference aspects, taking into account the knowledge of the node's environment (as provided by the minimal TM 305' and the overall minimum optimal size CM 330).

The MRA 345 is built by (the MRA creator 350 of) the node N by querying its neighbor nodes (e.g., the node $N_n$); if the considered point of the territory (point 610 in the shown example) can be served, in addition to node N, also by (at least one of) the neighbor nodes (meaning that the considered point also belongs to the ARA 335 of—at least one of—the neighbor nodes), the neighbor node(s) answer(s) to the query by providing to the node N the list of records contained in their respective ARAs 335 for that territory point.

When a network node changes its configuration, it updates its own ARA 335 as described in the foregoing and, as a consequence, the MRAs 345 of all its neighbor nodes are also updated. Again, a configuration change, in this context, means whichever change can affect the radiation characteristics experienced by a territory point in the node's TM, thereby causing a change of a node's ARA 335. In this view, the MRA 345 of the node N is updated once the node N is activated and every time there are changes in the configuration of either the node N or its neighbor nodes.

The modalities according to which the node N is made aware about changes in the configuration of its neighboring nodes can be:
  Scanning mode: the considered node N performs a scan of the whole space around itself by beams of the antennas of its AS 205 or scanning of the communication link ports for the communication with other nodes that equip the node (as an example Ethernet ports); once the node N connects to a neighbor node (e.g., neighbor node Nn) it can establish with the connected neighbor node a data exchange relationship to exchange data relevant to the construction/update of the MRA 345.
  Direct mode: an OAM network function makes the node N aware about the neighbor nodes with which node N can be in relationship;
  Indirect mode; by analyzing the MRA provided thereto by its neighbor nodes, the node N can assess if there are nodes that are not in direct relationship with the node N but are able to reach with their radio signals points pertaining to its minimal TM 305'.

The ways a relationship with surrounding nodes can be established are not in the scope of this document.

The first data structure (ARA) 335 and the second data structure (MRA) 345 are sufficient to allow a generic network node to take operating decisions in aspects that are influenced by the radio signal propagation and intra-/inter-cell interference aspects, taking into account the node's environment.

Advantageously, according to an embodiment of the solution disclosed herein, a third data structure 355 named Current Availability Service Array (CASA) is then built by a third data structure (CASA) creator 360. In the third data structure 355, which has the same dimension as the minimal TM 305', for each point of the territory served by the node N, there is defined a list of records, each one reporting the presence and the characteristics of a UE placed in that point, for the time the considered UE is in connected mode with the node N, the status or type of service required to the node N by that UE and the resources of the node N dedicated to serving that UE. The node N updates the CASA 355 every time a UE changes its service requests (for example, but not limited to, voice service, data service, etc.) or in case of UE movement (from that point to a different point). If the considered territory point belongs also to the MRA 345 (i.e., the considered territory point is covered also by at least one neighbor node), the node N also causes the CASA 355 of all the neighbor nodes sharing that point (e.g., node Nn) to be updated. Specifically, the CASA 355 gives a map of:
  a current service activity status distribution over the territory served by the node N, in other words a geo-referenced overview of the activity that the node N is performing during the life cycle of a UE, as an example, but not limited to, data connection, voice connection, data and voice connection, etc., for the time such UE is under the control of node N (i.e., served by node N);
  trajectories of UE served by the node N, referenced to the node's minimal TM 305', so as to allow the node N to compute, manage and decide, in advance, actions to be undertaken, such as (but not limited to):
    selection of the best serving beam for optimization of coverage while the UE is moving;
    overall service capability optimization of the node, for example, but not limited to, selection of the optimal beam to serve a group of UEs by the same beam, thereby reducing interference and energy consumption;
    interference management, by selecting appropriate beams to serve different UEs or changing serving frequency or RAT, on the base of the data contained in the ARA 335 and the MRA 345;
    change of serving node, actions that can be undertaken to maintain, guarantee and optimize the overall service delivery for the node N itself, for the UE and for the neighbor nodes, as an example in order to reduce or eliminate interference or to pre-alert a neighbor node for an incoming UE.

Under this point of view, the management of the life cycle of the activity of a UE can be foreseen a-priori by a node, thanks to the fact that the network nodes (serving node and neighbor nodes), by means of the information contained in the respective minimal TM 305', ARA 335, MRA 345 and CASA 355, can learn and define, a-priori, actions to be undertaken to manage the life cycle of the served UE and then the nodes can activate all the necessary mechanisms so as to perform these actions. An example of that is the prediction of trajectories that a UE can follow: by analyzing the path followed by the UE, related to the minimal TM 305' for topography and to the ARA 335 and the MRA 345, the generic network node can foresee which could be the next position of the considered UE and then select the best solution to serve the UE, where by "best solution" there is intended the best serving node (the considered node itself or a neighbor node) and/or the best serving antenna of the AS of the node and/or the best serving antenna beam that the node can radiate to deliver the service to the UE on that time-space point. In greater detail, the choice can be made in terms of, as an example, but not only:
  the best antenna $210_1$-$210_p$ of the AS 205 and the best antenna beam $215_1$-$215_m$ of the node N to be used to serve the UE in the foreseen point with the best signal level;
  the best antenna $210_1$-$210_p$ of the AS 205 and the best antenna beam $215_1$-$215_m$ of the node N to be used to serve the UE in the foreseen point by minimizing the interference produced by the node itself, by using beams that decouple coverage;
  the best antenna $210_1$-$210_p$ of the AS 205 and the best antenna beam of the AS of the node N to be used to serve the UE in the foreseen point by minimizing the interference produced by the node itself towards neighbor nodes, by using beams that decouple coverage;

the best neighbor node and the corresponding antenna of its AS and antenna beam to serve the UE in the foreseen point.

Since the minimal TM 305', the ARA 335, the MRA 345 and the CASA 355 provide a global geo-referenced image of the service that the node N is providing at a certain time, the node N can make decisions for the optimization of its performances; an example of that is the decision that a node can make of serving with a same beam all the UE in a geographic area that can be covered by just one beam $215_1$-$215_m$ of an antenna $210_1$-$210_p$ of the AS 205, or the decision of causing the UE to be served by a neighbor node, like node Nn, working on another RAT/frequency to avoid interference, and the node N can make such a decision just by analyzing the MRA 345.

The construction of the third data structure (CASA) 355 requires the localization of the UE over the territory. Localization can be intended as:

topological localization: it is a localization expressed in terms of UE position, derived for example by GPS positioning or triangulation positioning by analyzing the electromagnetic field level of neighbor nodes in electromagnetic visibility measured by the UE;

electromagnetic positioning: once the beam used to serve or to link a UE is known, an estimation of the position of the UE can be obtained by measuring the UE received power on the beam, even if it is not in optical visibility.

A record associated to the localized UE is then included in the CASA 355 in correspondence of the point of the territory corresponding to the UE whose localization has been estimated. In both cases, the accuracy in the localization of the UE is not crucial; more important is to localize and characterize served regions and trajectories over the territory and relate them to the environment topography, within the definition obtainable by the available antenna beams, associated to the typology of the required service (for example, a relatively narrow and low-power beam can advantageously assigned to serve a static UE, whereas for serving a moving UE a wider and higher power beams is preferable).

Figure 8:
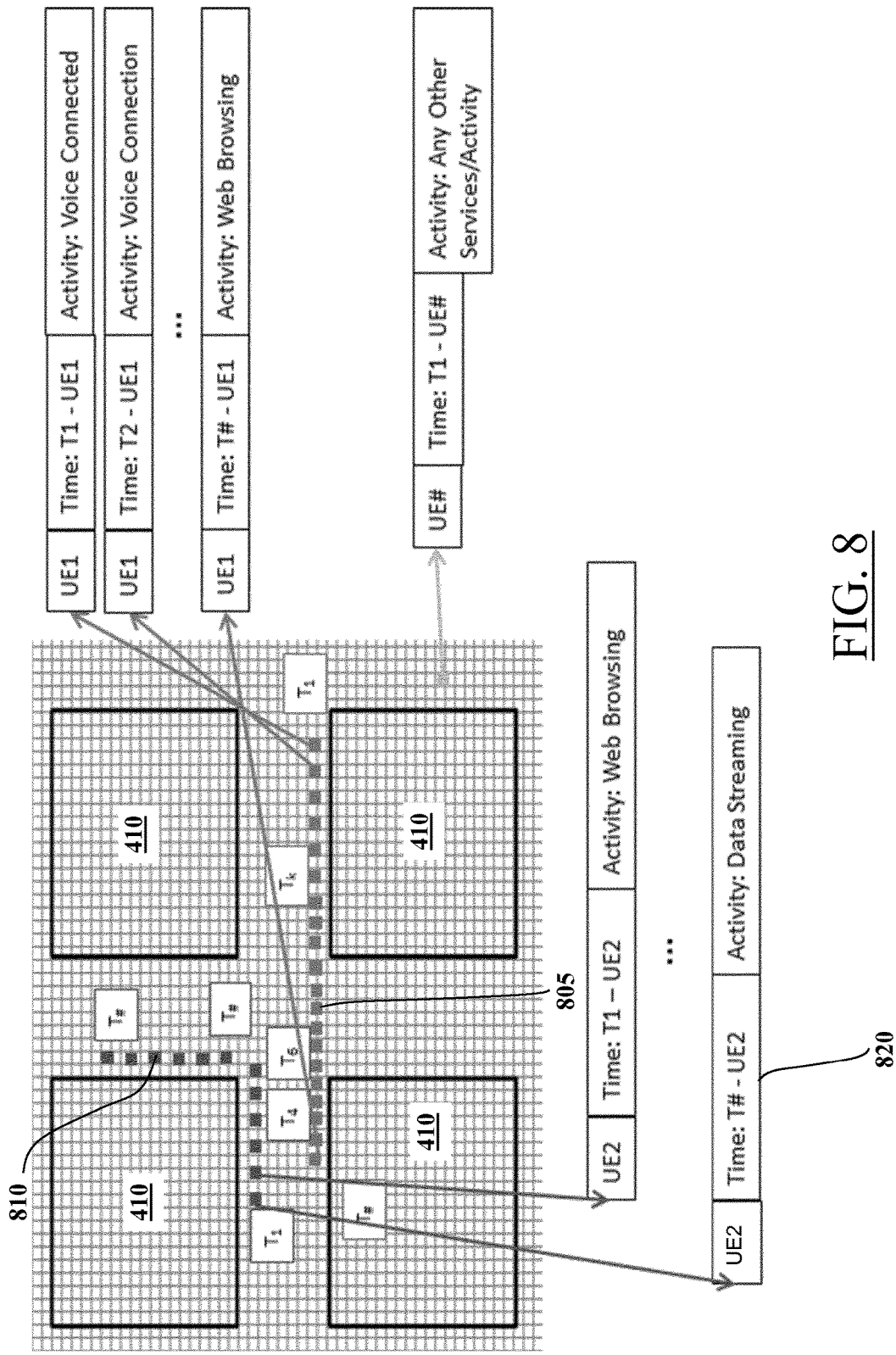
FIG. 8 shows a third data structure built in accordance with an embodiment of the solution disclosed herein.

FIG. 8 shows a pictorial representation of an exemplary third data structure (CASA) 355. Reference numerals 805 and 810 denotes two trajectories followed by two UE (reference numerals reference numerals T1, T4, T# denote the time instants corresponding to a sequence of three positions along the trajectory 805, and reference numerals T1, T4, T6, T#, T# denote the time instants corresponding to a sequence of five positions along the trajectory 810). For each time instant of each trajectory 805, 810 there is an associated record, like the record denoted 820 that contains (in the shown example): an identifier of the UE, an indication of the time instant, an indication of the service required by the UE, as well as, possibly, other data not depicted in the drawing.

Advantageously, according to an embodiment of the solution disclosed herein, a fourth data structure 365 referred to as Service Time Image Map Array (STIMA) is created by a fourth data structure (STIMA) creator 370. In the fourth data structure 365, for each point of the territory in the minimal TM 305' and over the time there is defined a list of records describing the type of services required in the time by the UE that are stationary for that point ("aggregation points" or "accumulation point") for at least a predetermined time duration, together with the occurrences for each type of service. Examples of accumulation points are: bus stops, meeting points, points along preferred paths, etc. In this way, a dynamic space/time image of which types of services are required during the time in each point of the territory served by the node N is given. Specifically, for each territory point the service required by each UE located in that point and a time stamp indicating when the service has been required are recorded. For the construction, maintenance and usage of the STIMA array 365, it is not essential to get and store identification data of the UE. The time stamp is useful to get statistics and to remove obsolete (too old) occurrences, maintaining updated the image of the service dynamics. The STIMA 365 could be multidimensional in the time if it is desired to put into evidence time-dependent behaviours, like for example:

the STIMA 365 could have 8 layers in the time, to highlight daily behaviours every 3 hours; the first layer is from 0.00 am to 3.0 am, the fifth from 12.00 am to 3.00 pm and so on;

the STIMA could have 7 layers in the time, to highlight weekly behaviours with a daily time resolution.

The STIMA 365 is used to estimate, a priori, what could be the most probable activity that the node N should perform when a UE that is following a certain path described in the CASA 355 (like the trajectory 805 or 810 in FIG. 8) is approaching one of the accumulation points defined in the STIMA 365. Based on such an activity estimation, the node N is able to prepare actions to best serve the UE or modify its configuration (as an example, but not only, the node N can decide what is the best antenna and beam of its AS 205 to serve the considered UE, taking into account the traffic situation described in the CASA 355, how many resources are needed to serve UE located in accumulation points, pre-configure in time the node N to serve traffic peaks during certain hours of the day etc.). The STIMA 365 is an aggregate of data that provides the history of what UE have done in the past in certain points of the territory served by a node. For example, by knowing that a certain point of the territory served by the node is an accumulation point, and that, statistically, UE stationary in that point request mainly services of a certain kind (e.g., web browsing), the node that is serving a certain UE that is moving along a path and that is approaching the accumulation point can in advance prepare itself to provide to that UE the service that more likely will be requested when the UE reaches the accumulation point.

The fourth data structure 365 can be created in various ways, for example by analyzing the third data structure 355.

Figure 9:
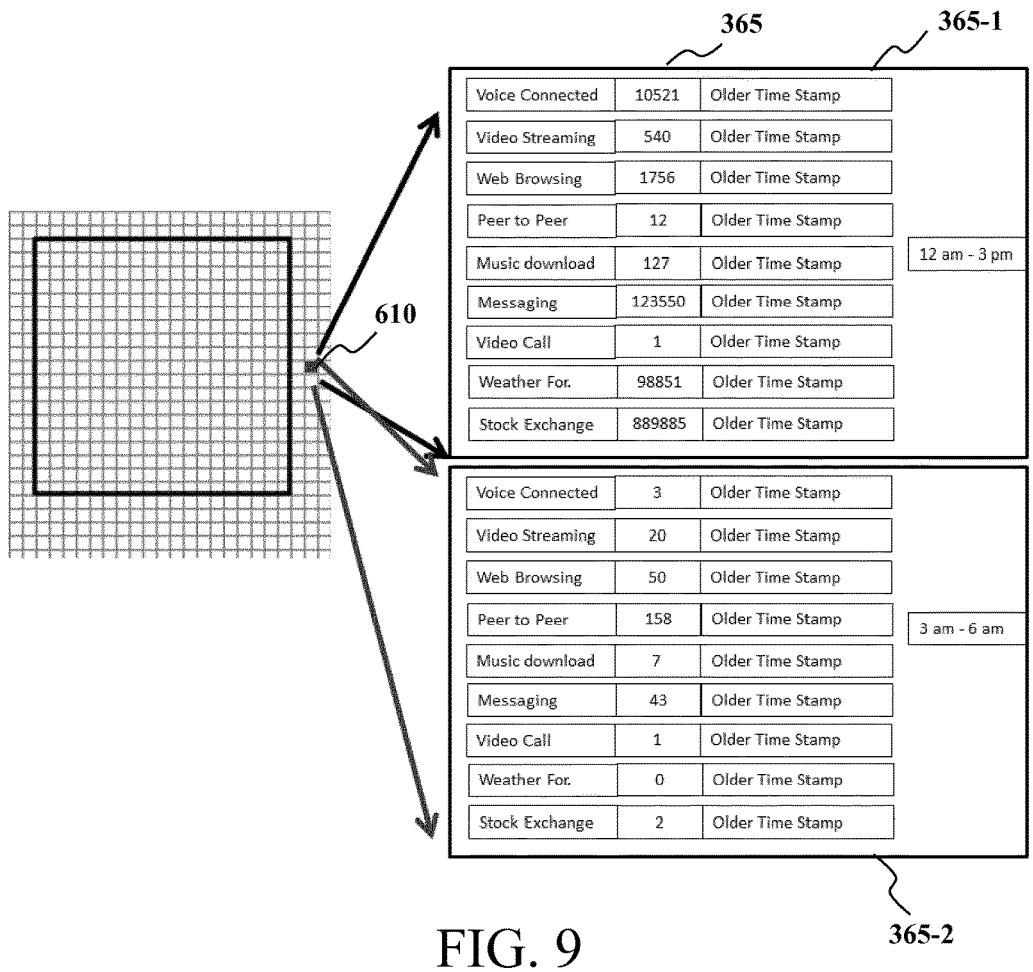
FIG. 9 shows a fourth data structure built in accordance with an embodiment of the solution disclosed herein.

FIG. 9 shows a piece of an exemplary fourth data structure (STIMA) 365, associated to a point of the territory (the point 610 considered in FIGS. 6 and 7). In particular, two time layers 365-1 and 365-2 of the above-mentioned 8 time layers are shown, one corresponding to the three hours from 3 am to 6 am, the other corresponding to the three hours from 12 am to 3 pm.

Summarizing, while the first data structure (ARA) 335 and the second data structure (MRA) 345 are sufficient to allow a generic network node to take operating decisions on aspects that are influenced by the radio signal propagation and intra-/inter-cell interference aspects, taking into account the node's environment, the third data structure (CASA) 355 and, where present, the fourth data structure (STIMA) 365 allows the network node to take operating decisions on aspects that relate to the services provided/to be provided by the node.

Not only the neighbour network nodes exchange (part of) their respective first data structures 335 (so as to create the second data structures 345 and keep them updated): also the third data structure 355 and the fourth data structure 365 are preferably exchanged between neighbour network nodes. For example, a certain network node, in preparation of a hand-over to another, neighbor network node of a certain UE, transfers to the neighbour network node the records of its CASA 355 related to the previous positions of that UE, and possibly the records of its STIMA 365 related to an accumulation point that the UE to be handed-over is approaching.

In the following part of this description, some examples of applicability of the solution disclosed herein are provided.

EXAMPLE 1

Figure 10:
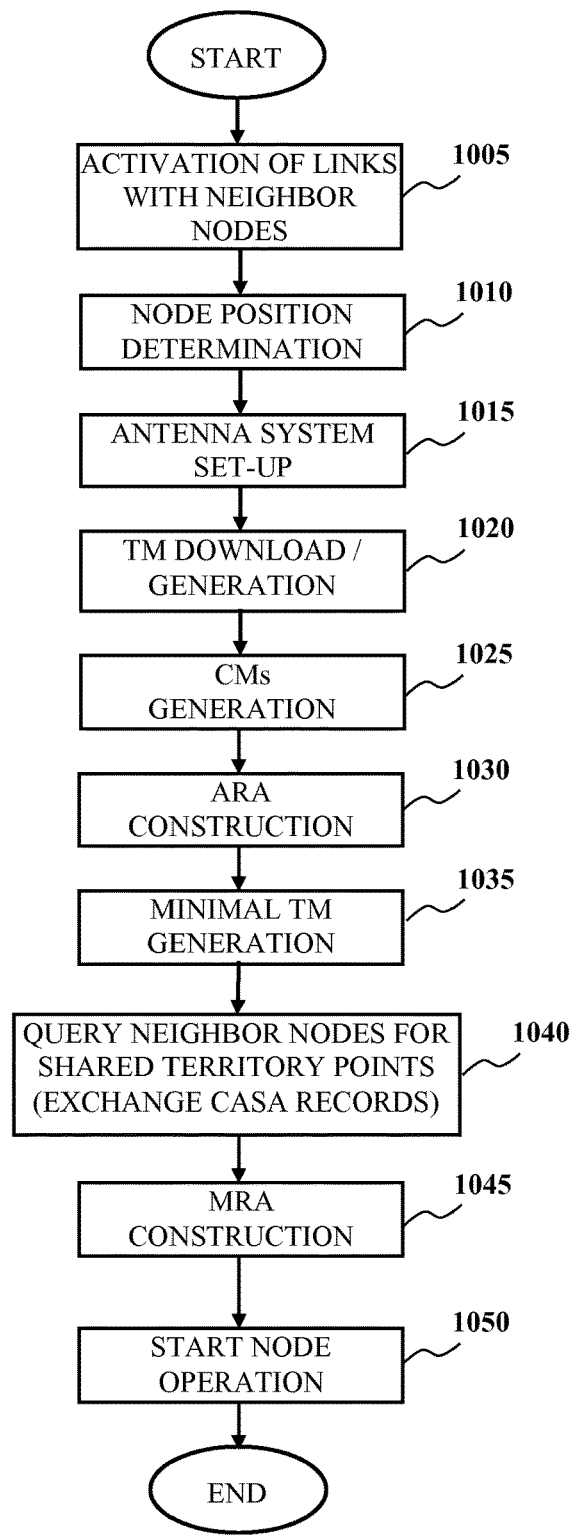
FIG. 10 is a schematic flowchart showing some actions performed by a network node in an exemplary use case of the solution disclosed herein.

New Node Deployment or Implementation of a New Feature on an Already Deployed Node Taking advantage of the solution disclosed herein, an exemplary procedure for the deployment of a new network node, or for the implementation of a new feature on an already deployed node (as an example, but not only, deployment of a new RAT in the node N, making available a new frequency band to the node N, change in the AS 205 of the node N, change in the radiated power of the node N) is the following, as schematized in the flowchart of FIG. 10.

Step 1 (Block 1005)
Activation of the links with neighbour nodes, as an example via IP addressing (this step is in general required also in the case of implementation of a new feature in an already deployed node: for example, if the new implemented feature is the provision of the node with an optical fiber connection to neighbour nodes).

Step 2 (Block 1010)
Determination of the node N position: by internal setup (for example, in case of deployment of a new network node, the newly deployed node has stored internally its geographic position, which can be programmed by a technician or by the O&M or by the core network) or by geo-referentiation;

Step 3 (Block 1015)
Node antenna system 205 set-up: internal setup or acquisition of beams characteristics from a data base (like the data base 220 of FIG. 2);

Step 4 (Block 1020)
Topographical map TM: internal generation (by the local TM builder 320) or downloaded by a TM Data Base (like the data base 310);

Step 5 (Block 1025)
Computation of all the coverage maps CMs, if necessary, for each of the beams $215_1$-$215_m$ of the antenna system 205 based on the beam characteristics on TM;

Step 6 (Block 1030)
Definition of coverage quantity threshold: internal setup or downloaded by a server;

Step 7 (Block 1030)
Construction of the ARA 335: collection of all coverage quantity values over the threshold from all the CMs;

Step 8 (Block 1035)
Reduction of TM to minimum (to obtain the minimal TM 305');

Step 9 (Blocks 1040 and 1045) Querying all neighbor nodes (like the node $N_n$) for territory points belonging to the minimal TM 305' in order to generate the MRA 345. If a certain territory point is also covered by a neighbor node (like the neighbor node Nn):

the considered node N receives the ARA 335 record associated to that point from the neighbor node Nn to be included in the MRA 345 of the node N;

the considered node N sends the record of its own ARA 335 in that territory point to the neighbor nodes also covering the considered territory point (e.g. the neighbor node Nn) in order to include such ARA record in the MRA 345 of the neighbor nodes (e.g., in the MRA of the neighbor node Nn);

Step 10 (Block 1050).
Start of Operations (see for an example of operations Example 2 and Example 3 below).

EXAMPLE 2

Updating the CASA 355 and the STIMA 365

Figure 11:
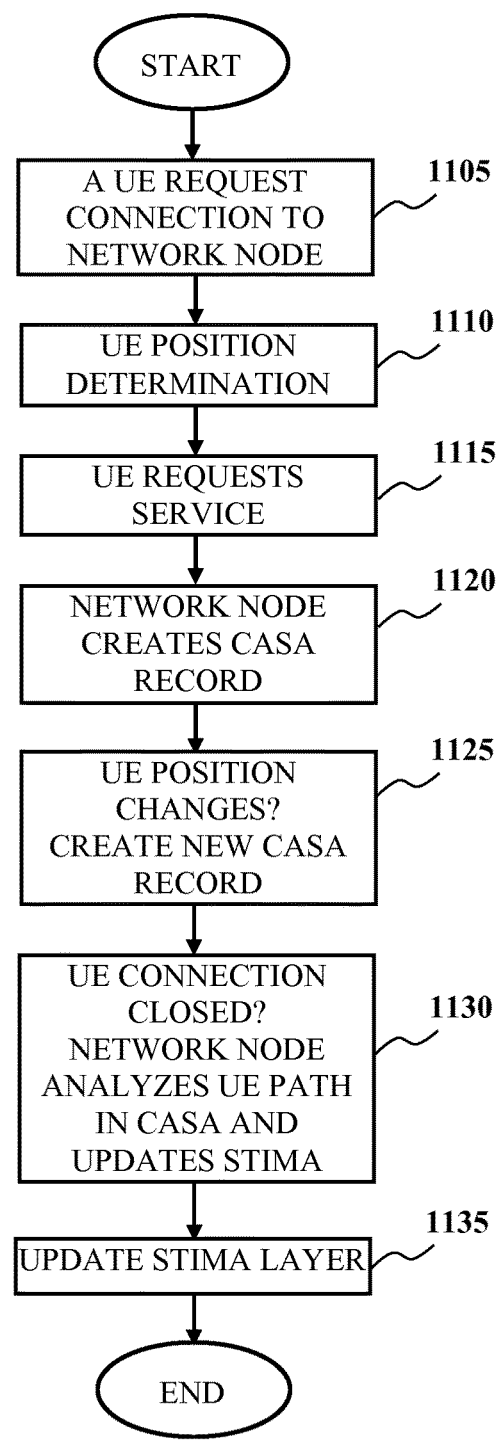
FIG. 11 is a schematic flowchart showing some actions performed by a network node in another exemplary use case of the solution disclosed herein.

An exemplary procedure for updating the CASA 335 and the STIMA 365 of a generic network node, e.g. node N, is the following, as schematized in the flowchart of FIG. 11.

Step 1 (Block 1105)
A UE requests the connection to a network node, e.g. node N.

Step 2 (Block 1110)
UE positioning:
if the considered UE has a GPS, the UE sends its position (determined by its GPS) to the node N;
if the considered UE can perform positioning by triangulation with other network nodes, the UE sends its position to the node N;
if the UE cannot perform positioning, the node N scans the area with the beams of its AS 205: UE position direction is estimated by beam tracking, UE distance is estimated by power received by the UE and measured by the node N.

Step 3 (Block 1115)
The considered UE requests a service.

Step 4 (Block 1120)
The node N creates a new record in the CASA 355 associated with the position detected for the UE, reporting the required service and time stamp.

Step 5 (Block 1125)
While the considered UE is in connection (connected mode), the UE periodically performs task (Step) 2 (UE positioning); if the UE position has changed, a new point in the CASA 355 is defined in the new position where the UE is.

Step 6 (Block 1130)
The STIMA 365 of node N is updated when the UE closes the connection, by analyzing the path in the CASA.

Step 7 (Block 1135)
For each stay of the UE in a certain territory point over the defined time duration threshold, the corresponding list in such a point in the proper time layer of the STIMA 365 is updated.

EXAMPLE 3

Figure 15:
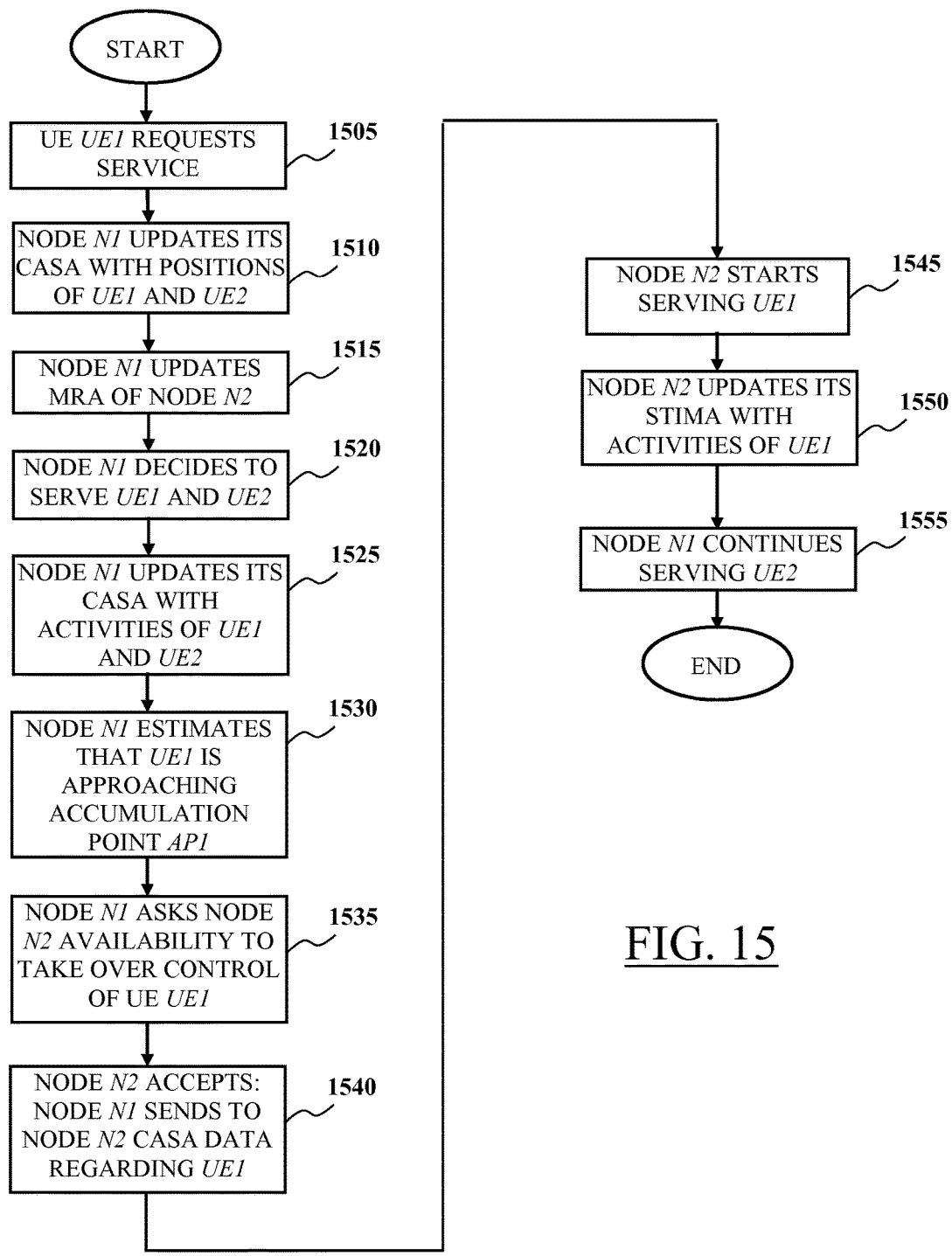
FIG. 15 is a schematic flowchart showing some actions performed by two network nodes in the scenario depicted in FIGS. 12, 13 and 14.

Usage of the STIMA 365 and the CASA 355 to Predict Antenna Beam to be Activated on Neighbor Nodes An example of operations is described in the following, making reference to the schematized flowchart of FIG. 15.

Figure 12:
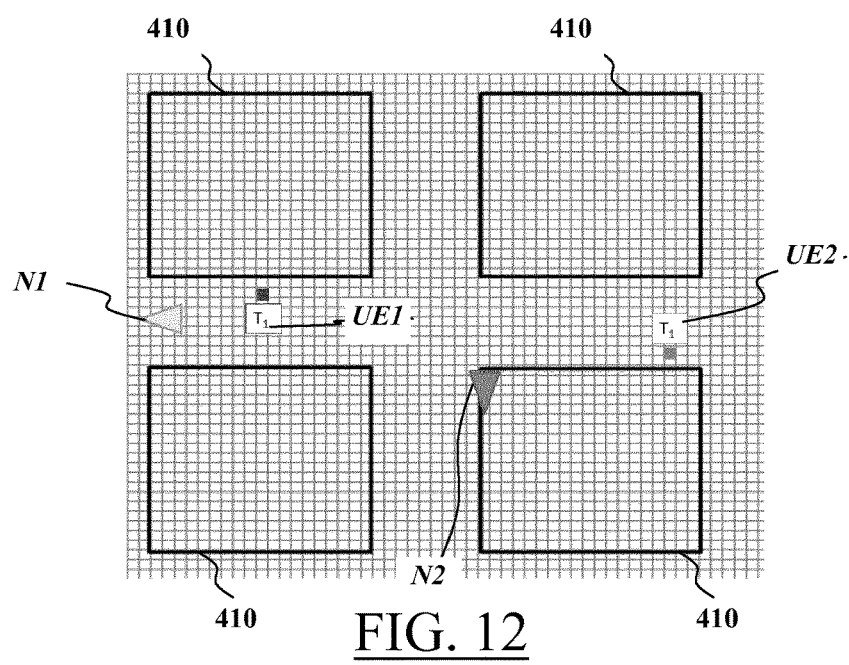
FIGS. 12, 13, 14A and 14B schematize an exemplary usage of the data structures.

Let the scenario depicted in FIG. 12 be considered: two network nodes N1 and N2 and two UE UE1 and UE2, in an urban scenario like that of FIG. 4A. Let it be assumed that one of the two UE, e.g. UE1 is requiring a service (block 1505), and that both UE UE1 and UE2 are to be served by the same network node, e.g. node N1 (the leftmost). Finally, let it be supposed that positioning has been performed at service request by both UE UE1 and UE2 on the serving node N1.

Figure 13:
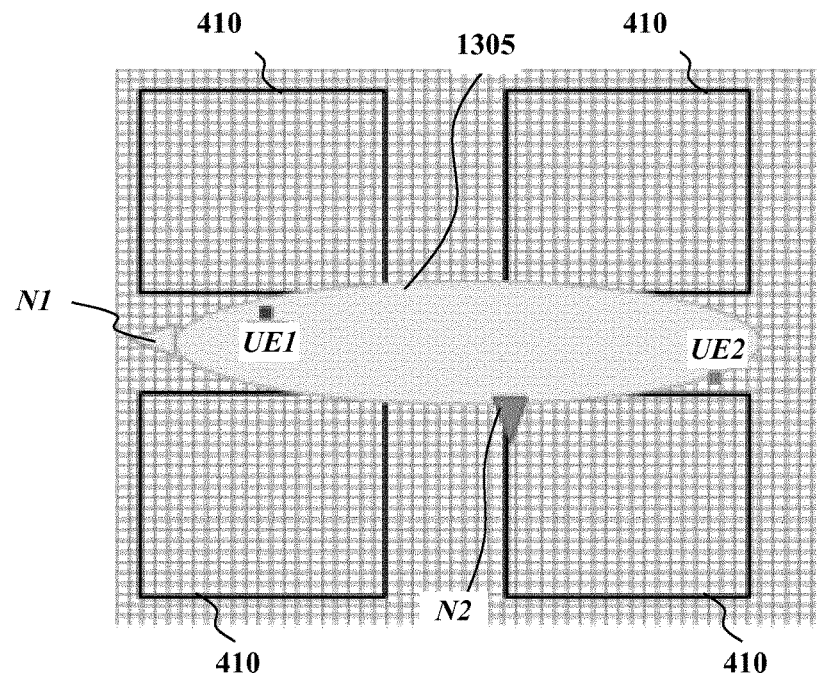

With this type of configuration, after the serving node N1 has updated its CASA 355 (block 1510) with the position of the UE UE1 and UE2 and the MRA 345 of the neighbor node N2 (block 1515), the node N1 makes the decision to serve both UE UE1 and UE2 with a directive beam 1305 (one of the beams $215_1$-$215_m$ of an antenna $210_1$-$210_p$ of its own AS 205), as schematized in FIG. 13 (block 1520). So, the node N1 (serving node) updates in its own CASA 355 the activities of the UE UE1 and UE2 (block 1525).

Figure 14A:
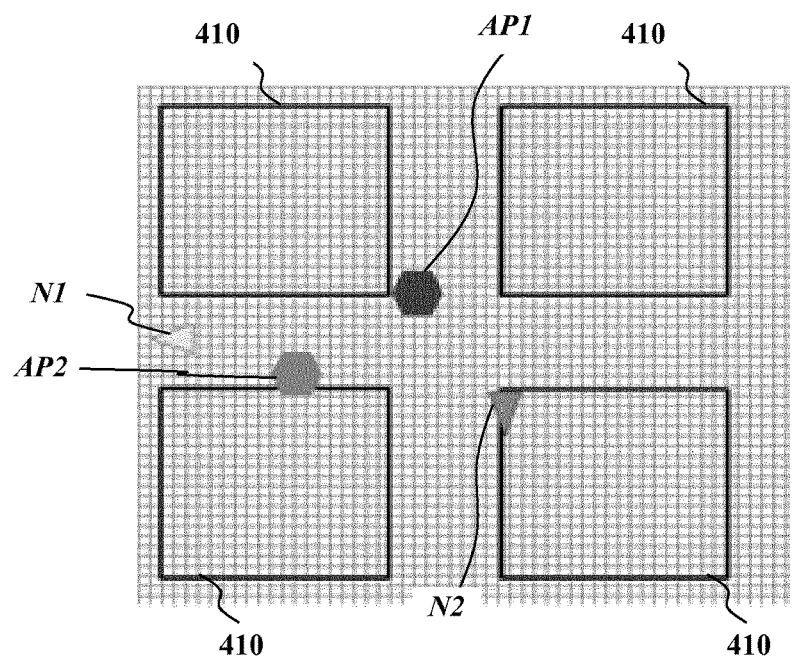

Let it be assumed that in the STIMA 365 of the serving node N1, two accumulation points happen to exist (AP1 and AP2 in FIG. 14A) for services, a first accumulation point AP1 being close to a building block corner (e.g., it could be a meeting point, like a bar) and a second accumulation point AP2 being along the lower-left building block, e.g. a bus stop.

When the leftmost UE UE1 is approaching to the corner of the upper-left building block 410, the serving node N1 can estimate that the UE UE1 is approaching to the first accumulation point AP1 (block 1530) and, by inspecting its own CASA 355 and STIMA 365, the serving node N1 can decide whether to continue to serve the rightmost UE UE2 while leaving the leftmost UE UE1 to the neighbor node N2.

The serving node N1 asks the neighbor node N2 if it can take control of the UE UE1 (block 1535) and, on positive answer, the node N1 communicates to the neighbor node N2 the CASA 355 data regarding such UE UE1 (block 1540), while for the moment still continuing to serve the UE UE1.

The above step is intended as a preparation phase for the actual handover procedure. When the estimation of the available resources is performed by simultaneously monitoring all the UEs in a given area, a traffic and load balancing among nodes can be performed. This is more accurate than typical SON load balancing algorithms, as it considers traffic changes over the time and the space.

Figure 14B:
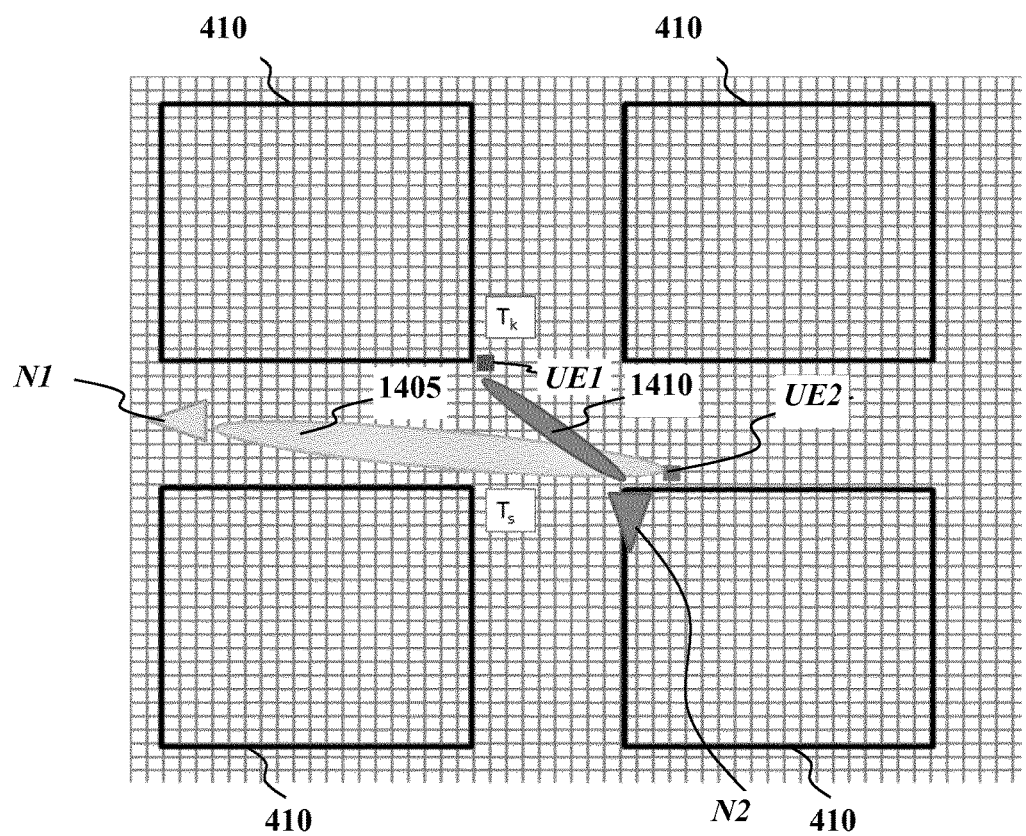

When ready, the neighbor node N2 will start serving the UE UE1 (block 1545), that leaves the previous serving node N1. The neighbor node N2 starts updating its own CASA 355 and STIMA 365 on activity of the UE UE1 (block 1550). The node N1 continues to serve the UE UE2 with a proper antenna beam 1405 (FIG. 14B) selected among the set of beams of its antenna system for the UE UE2 position (block 1555). The beam's characteristics are chosen by querying the ARA 345, the MRA 355 and the CASA 365 so to avoid using a coverage generating interference. The node N2 does the same for the UE UE1 by querying its own ARA, MRA and CASA, and selects a suitable antenna beam 1410 for serving the UE UE1.

Several variations of the embodiments described in the foregoing are possible.

For example, any of the first, second, third and fourth data structure creators 340, 350, 360, 370 can be implemented as functionalities residing on a remote server, remote from the physical location of a node; such functionalities may be invoked by a node when necessary. Similarly, any of the first, second, third and fourth data structures 335, 345, 355, 365 can reside in the cloud instead of in a node (intended as an apparatus located in a certain point of the territory). More generally, what is called to as "node" in the present description could be regarded as a logical concept, including a part located in a certain territory point, and another part that can be in the cloud.

The invention claimed is:

1. A radio access network node of a telecommunication network, comprising:
    a system of radiating antennas comprising at least one radiating antenna for radiating radio signals through a geographic territory;
    a processor configured to execute computer-readable instructions to:
        obtain or generate a topographic map describing topography of the geographic territory;
        based on the topographic map, calculate a coverage map of radio coverage of the geographic territory by the radio signals radiated by the system of radiating antennas;
        based on the coverage map, shrink the topographic map to obtain a reduced-size topographic map describing the topography of a geographic area, within the geographic territory, that can be served by the node;
        based on the calculated coverage map, create a first data structure comprising a plurality of first data structure records, one for each point of the calculated coverage map, each of the first data structure records providing a description of a service delivery capability of the node in that point;
        exploit the first data structure to decide how to serve user equipment located in the territory corresponding to the reduced-size topographic map.

2. The radio access network node of claim 1, wherein the processor is further configured to execute computer-readable instructions to:
    identify neighbor network nodes in a neighborhood of the node;
    based on the reduced-size topographic map, create a second data structure comprising a plurality of second data structure records, one for each point of the reduced-sized topographic map, each of the second data structure records providing a description of a service delivery capability, in that point, of at least one neighbor network node; and
    decide whether to have the node serve or continue to serve a user equipment located in a point of the geographic area served by the node or to cause the node to ask a neighbor node to serve the user equipment, based on the data contained in the first data structure and second data structure.

3. The radio access network node of claim 1, wherein the topographic map of the geographic territory comprises one among a two-dimensional (2D) map of the geographic area enriched with estimations of heights and a three-dimensional (3D) topography map of the geographic territory.

4. The radio access network node of claim 1, wherein the topographic map of the geographic territory is either downloaded from a remote database of digital topographic maps of the environment, or generated onsite by the node or by a remote system in real time by processing mono/stereoscopic images of the environment.

5. The radio access network node of claim 1, wherein the description of a service delivery capability of the node in a point comprises one or more of:
    an indication of a Radio Access Technology (RAT) used to serve that point;
    an indication of a radiating antenna of the system of radiating antennas used to cover that point;

an indication of a frequency channel associated to that point;

an indication of a radio coverage quantity associated to that point.

6. The radio access network node of claim 5, wherein the processor is configured to execute computer-readable instructions to update the first data structure in response to a change in a configuration of the network node.

7. The radio access network node of claim 2, wherein each of the second data structure records contains data corresponding to the data contained in the first data structure record of the at least one neighbor network node for the considered point.

8. The radio access network node of claim 7, wherein each of the second data structure records comprises an identifier of the at least one neighbor node.

9. The radio access network node of claim 7, wherein the processor is configured to execute computer-readable instructions to update the second data structure in response to a change in a configuration of at least one neighbor network node.

10. The radio access network node of claim 2, wherein the processor is further configured to execute computer-readable instructions to:
create a third data structure comprising a plurality of third data structure records, each of the third data structure records comprising, for user equipment served by the node, data indicative of territory points, in the territory corresponding to the reduced-size topographic map, visited by the served user equipment, and data indicative of types of services provided by the node to the served user equipment in each territory point.

11. The radio access network node of claim 10, wherein the processor is further configured to execute computer-readable instructions to:
exploit the information contained in the third data structure for deriving at least one of:
a geo-referenced map of the services provided by the node to user equipment for the time the user equipment are served by the node;
trajectories of the user equipment served by the node N; and
decide in advance actions to be undertaken by the node, the actions including at least one of:
selection of the best serving radiating antenna for optimization of coverage while each user equipment is moving;
optimization overall service capability of the node, including selection of the radiating antenna adapted to reduce interference and energy consumption;
management of interference by selecting radiating antennas to serve different user equipment or changing serving radio frequency or RAT, based on data contained in the first data structure and second data structure;
change of serving node.

12. The radio access network node of claim 11, wherein the processor is further configured to execute computer-readable instructions to:
create a fourth data structure comprising a list of fourth data structure records, one for each point of the reduced-size topographic map, each of the fourth data structure records containing data indicative of the type of services required in the time by user equipment that remain stationary in that point for a predetermined time duration; and exploit the information contained in the fourth data structure for having the node to foresee services to be provided to served user equipment approaching a point of the reduced-size topographic map.

13. A method of operating a radio access network node of a telecommunication network, the node including a system of radiating antennas including at least one radiating antenna for radiating radio signals through a geographic territory, the method comprising:
obtaining or generating a topographic map describing topography of the geographic territory;
based on the topographic map, calculating a coverage map of radio coverage of the geographic territory by the radio signals radiated by the system of radiating antennas;
based on the coverage map, shrinking the topographic map to obtain a reduced-size topographic map describing the topography of a geographic area, within the geographic territory, that can be served by the node;
based on the calculated coverage map, creating a first data structure comprising a plurality of first data structure records, one for each point of the calculated coverage map, each of the first data structure records providing a description of a service delivery capability of the node in that point;
exploiting the first data structure to decide how to serve user equipment located in the territory corresponding to the reduced-size topographic map.

14. The method of claim 13, further comprising:
identifying neighbor network nodes in a neighborhood of the node;
based on the reduced-size topographic map, creating a second data structure comprising a plurality of second data structure records, one for each point of the reduced-size topographic map, each of the second data structure records providing a description of a service delivery capability, in that point, of at least one neighbor network node; and
deciding whether to have the node serve or continue to serve a user equipment located in a point of the geographic area served by the node or to cause the node to ask a neighbor node to serve the user equipment, based on the data contained in the first data structure and second data structure.

15. The method of claim 13, further comprising either downloading the topographic map of the geographic territory from a remote database of digital topographic maps of the environment, or generating the topographic map onsite at the node or at a remote system in real time by processing mono/stereoscopic images of the environment.

16. The method of claim 13, wherein the description of a service delivery capability of the node in a point comprises one or more of:
an indication of a Radio Access Technology (RAT) used to serve that point;
an indication of a radiating antenna of the system of radiating antennas used to cover that point;
an indication of a frequency channel associated to that point;
an indication of a radio coverage quantity associated to that point.

17. The method of claim 16, comprising updating the first data structure in response to a change in a configuration of the network node.

18. The method of claim 14, wherein each of the second data structure records comprises data corresponding to the data contained in the first data structure record of the at least one neighbor network node for the considered point, and an identifier of the at least one neighbor node.

19. The method of claim 13, further comprising updating the second data structure in response to a change in a configuration of at least one neighbor network node.

20. The method of claim 14, further comprising:
creating a third data structure comprising a plurality of third data structure records, each of the third data structure records comprising, for user equipment served by the node, data indicative of territory points, in the territory corresponding to the reduced-size topographic map, visited by the served user equipment, and data indicative of types of services provided by the node to the served user equipment in each territory point.

21. The method of claim 20, further comprising:
exploiting the information contained in the third data structure for deriving at least one of:
a geo-referenced map of the services provided by the node to user equipment for the time the user equipment are served by the node;
trajectories of the user equipment served by the node N; and
deciding in advance actions to be undertaken by the node, such actions including at least one of:
selection of the best serving radiating antenna for optimization of coverage while each user equipment is moving;
optimization overall service capability of the node, including selection of the radiating antenna adapted to reduce interference and energy consumption;
management of interference by selecting radiating antennas to serve different user equipment or changing serving radio frequency or RAT, based on data contained in the first data structure and second data structure;
change of serving node.

22. The method of claim 21, further comprising:
creating a fourth data structure comprising a list of fourth data structure records, one for each point of the reduced-size topographic map, each of the fourth data structure records containing data indicative of the type of services required in the time by user equipment that remain stationary in that point for a predetermined time duration; and
exploiting the information contained in the fourth data structure for having the node to foresee services to be provided to served user equipment approaching a point of the reduced-size topographic map.

* * * * *